US012675600B2

(12) United States Patent
Teng et al.

(10) Patent No.: US 12,675,600 B2
(45) Date of Patent: Jul. 7, 2026

(54) PRIVACY ENHANCED LANGUAGE MODEL PROMPT

(71) Applicant: QUALCOMM Incorporated, San Diego, CA (US)

(72) Inventors: Diyan Teng, Sunnyvale, CA (US); Mehul Soman, San Jose, CA (US); Junsheng Han, Los Altos Hills, CA (US); Nauman Shahid, Cork (IE); Rashmi Kulkarni, Redwood City, CA (US); Justin Mcgloin, Los Altos, CA (US); Brian Momeyer, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 18/492,132

(22) Filed: Oct. 23, 2023

(65) Prior Publication Data

US 2025/0131121 A1     Apr. 24, 2025

(51) Int. Cl.
| | |
|---|---|
| *G06F 21/62* | (2013.01) |
| *G10L 15/183* | (2013.01) |
| *G10L 15/22* | (2006.01) |
| *G10L 15/30* | (2013.01) |
| *G06N 20/00* | (2019.01) |

(52) U.S. Cl.
CPC ........ *G06F 21/6245* (2013.01); *G10L 15/183* (2013.01); *G10L 15/22* (2013.01); *G10L 15/30* (2013.01); *G06N 20/00* (2019.01); *G10L 2015/227* (2013.01)

(58) Field of Classification Search
CPC ... G06F 21/6245; G10L 15/183; G10L 15/22; G10L 15/30

USPC .......................................................... 726/26
See application file for complete search history.

(56) References Cited

U.S. PATENT DOCUMENTS

| | | | |
|---|---|---|---|
| 9,058,813 B1 | 6/2015 | Blanksteen | |
| 11,297,024 B1 * | 4/2022 | Madan .................. | H04L 63/104 |
| 11,516,158 B1 | 11/2022 | Luzhnica et al. | |
| 12,061,970 B1 | 8/2024 | Lo et al. | |
| 12,505,308 B2 | 12/2025 | Abraham et al. | |

(Continued)

FOREIGN PATENT DOCUMENTS

| | | |
|---|---|---|
| CN | 116595977 A | 8/2023 |
| WO | 2023087247 A1 | 5/2023 |

OTHER PUBLICATIONS

Feild H., et al., CrowdLogging: Distributed, Private, and Anonymous Search Logging, SIGIR '11: Proceedings of the Th International ACM Sigir Conference on Research and Development in Information Retrieval, Jul. 24, 2011, 10 Pages.
Li Y., et al., "Privacy-Preserving Prompt Tuning for Large Language Model Services", arXiv:2305.06212v1 [cs.CL] May 10, 2023, 13 Pages.
Resendiz Y.M., "Emotion-Conditioned Text Generation through Automatic Prompt Optimization", arXiv:2308.04857v1 [cs.CL], Aug. 9, 2023, 7 Pages.

(Continued)

*Primary Examiner* — Meng Vang
(74) *Attorney, Agent, or Firm* — Muncy, Geissler, Olds & Lowe, P.C.

(57) ABSTRACT

Various embodiments include systems and methods for generating a prompt for a large generative AI model (LXM). A computing device may be configured to receive a user prompt, process the received user prompt to recognize whether the prompt includes privacy information or will cause an LXM to provide a response that will reveal privacy information; and use the LXM to provide a response to the user prompt in a manner that will avoid disclosure of privacy information.

20 Claims, 22 Drawing Sheets

400

402 — Receive A Prompt For The LXM From A User

404 — Process The Prompt To Recognize Whether The Prompt Includes Privacy Information Or Cause An LXM To Provide A Response That Will Reveal Privacy Information 406 — Use The LXM To Provide A Response To The Prompt From The User In A Manner That Will Avoid Disclosure Of Privacy Information

(56) References Cited

U.S. PATENT DOCUMENTS

| | | | |
|---|---|---|---|
| 2008/0005067 | A1 | 1/2008 | Dumais et al. |
| 2014/0278409 | A1 | 9/2014 | Hakkani-Tur et al. |
| 2014/0280629 | A1 | 9/2014 | Rubinstein et al. |
| 2018/0052885 | A1 | 2/2018 | Gaskill et al. |
| 2020/0134211 | A1 | 4/2020 | Miller et al. |
| 2020/0162444 | A1 | 5/2020 | Du |
| 2021/0042662 | A1 | 2/2021 | Pu et al. |
| 2022/0050919 | A1* | 2/2022 | Childress ............ G06F 21/6245 |
| 2023/0036623 | A1* | 2/2023 | Todasco ................. G06F 16/27 |
| 2023/0276229 | A1* | 8/2023 | Todasco ............. G06F 21/6245 |
| | | | 726/30 |
| 2024/0012842 | A1* | 1/2024 | Kislal ................... G06F 16/345 |
| 2024/0249016 | A1* | 7/2024 | Shashanka .......... G06F 21/6245 |
| 2025/0068764 | A1* | 2/2025 | Joshi ....................... G06F 40/20 |
| 2025/0131190 | A1 | 4/2025 | Teng et al. |

OTHER PUBLICATIONS

Chen Y., et al., "NetGPT: A Native-AI Network Architecture Beyond Provisioning Personalized Generative Services", arXiv:2307. 06148v1 [cs.LG], arxiv.org, Cornell University Library, 201 Olin Library Cornell University Ithaca, NY 14853, Jul. 12, 2023, pp. 1-7, XP091561278, The Whole Document.

International Search Report and Written Opinion—PCT/US2024/045007—ISA/EPO—Nov. 13, 2024.

Liang P., et al., "C5: Towards Better Conversation Comprehension and Contextual Continuity for ChatGPT", arXiv:2308.05567v1 [cs.AI], arxiv.org, Cornell University Library, 201 Olin Library Cornell University Ithaca, NY 14853, Aug. 10, 2023, 11 Pages, XP091590602, Section 5.2.2.

Waskito S., et al., "OTTER: Simplifying Embedded Sensor Data Collection and Analysis Using Large Language Models", Proceedings of The 31st ACM Conference on User Modeling, Adaptation and Personalization, ACMPUB27, New York, NY, USA, pp. 1-3, Oct. 2, 2023, pp. 1582-1584, XP059328330, The Whole Document.

* cited by examiner

300

302 — Receive A User Prompt For LXM

304 — Obtain User Context Information From One Or More Sources Of Physical Context Information And User Background Information 306 — Use The Received User Prompt And The Obtained User Context Information To Generate A Contextualized Prompt For Submission To An LXM 308 — Output The Generated Contextualized Prompt To The LXM

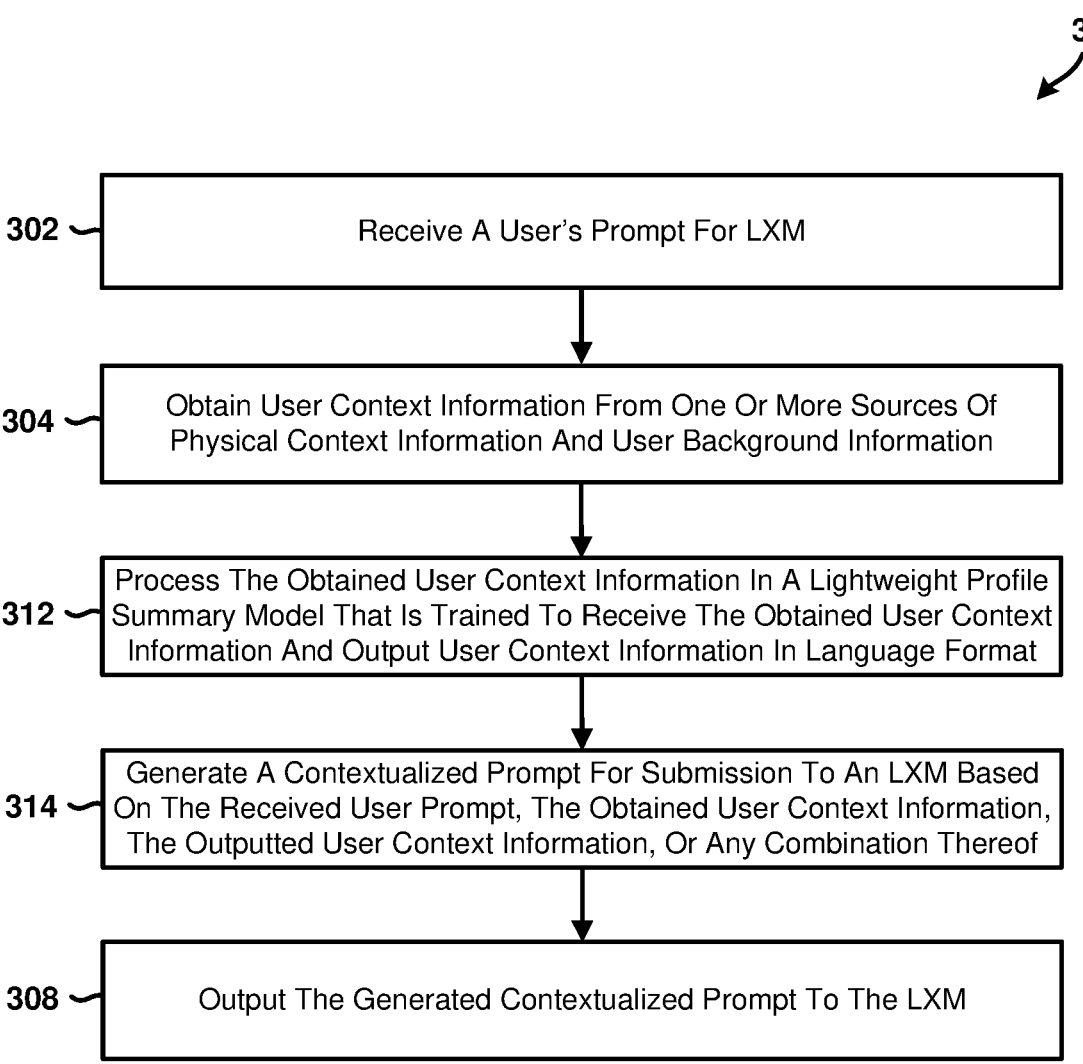

310

302 — Receive A User's Prompt For LXM

304 — Obtain User Context Information From One Or More Sources Of Physical Context Information And User Background Information 312 — Process The Obtained User Context Information In A Lightweight Profile Summary Model That Is Trained To Receive The Obtained User Context Information And Output User Context Information In Language Format 314 — Generate A Contextualized Prompt For Submission To An LXM Based On The Received User Prompt, The Obtained User Context Information, The Outputted User Context Information, Or Any Combination Thereof 308 — Output The Generated Contextualized Prompt To The LXM

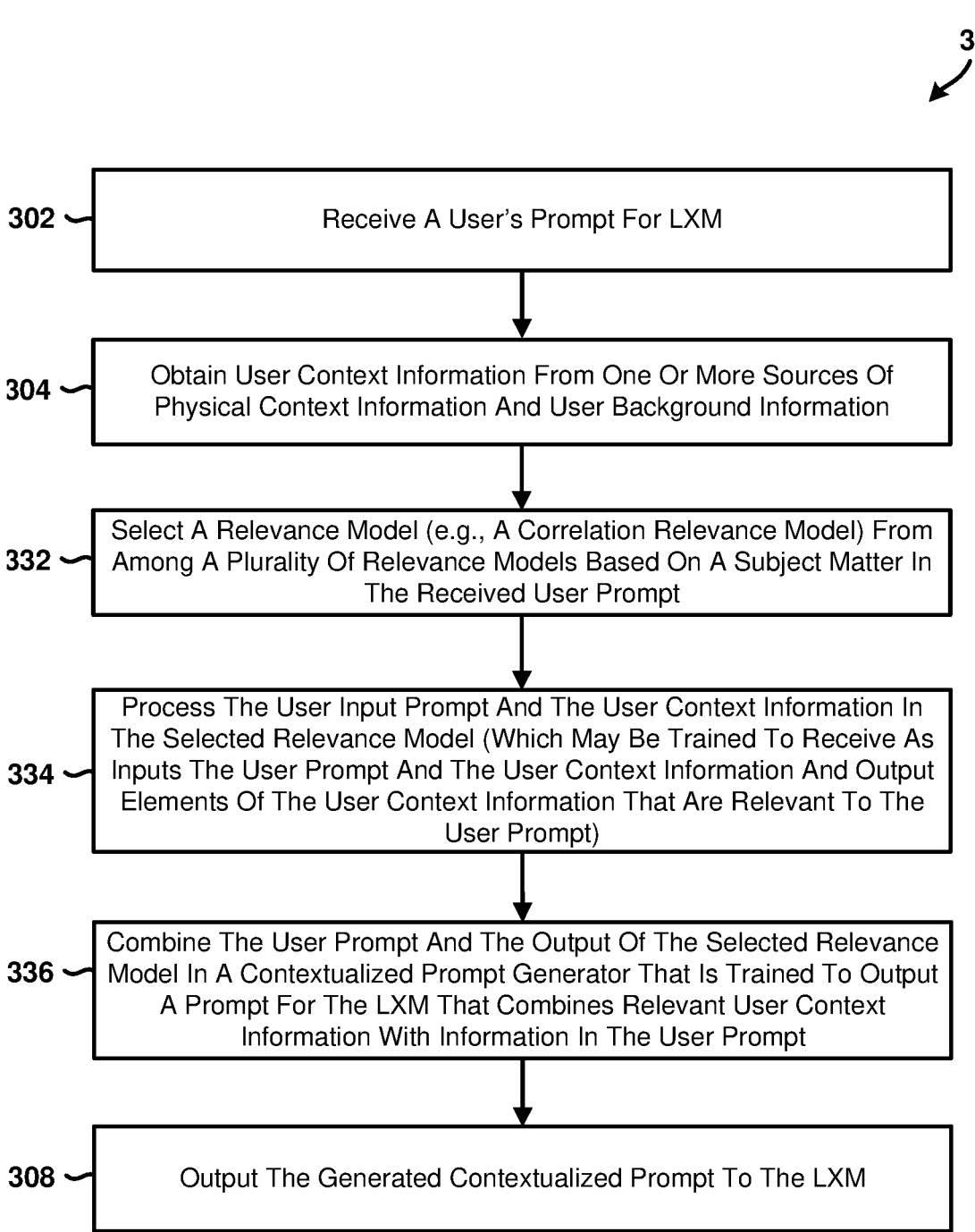

302 — Receive A User's Prompt For LXM

304 — Obtain User Context Information From One Or More Sources Of Physical Context Information And User Background Information 332 — Select A Relevance Model (e.g., A Correlation Relevance Model) From Among A Plurality Of Relevance Models Based On A Subject Matter In The Received User Prompt 334 — Process The User Input Prompt And The User Context Information In The Selected Relevance Model (Which May Be Trained To Receive As Inputs The User Prompt And The User Context Information And Output Elements Of The User Context Information That Are Relevant To The User Prompt)

336 — Combine The User Prompt And The Output Of The Selected Relevance Model In A Contextualized Prompt Generator That Is Trained To Output A Prompt For The LXM That Combines Relevant User Context Information With Information In The User Prompt 308 — Output The Generated Contextualized Prompt To The LXM

FIG. 3D

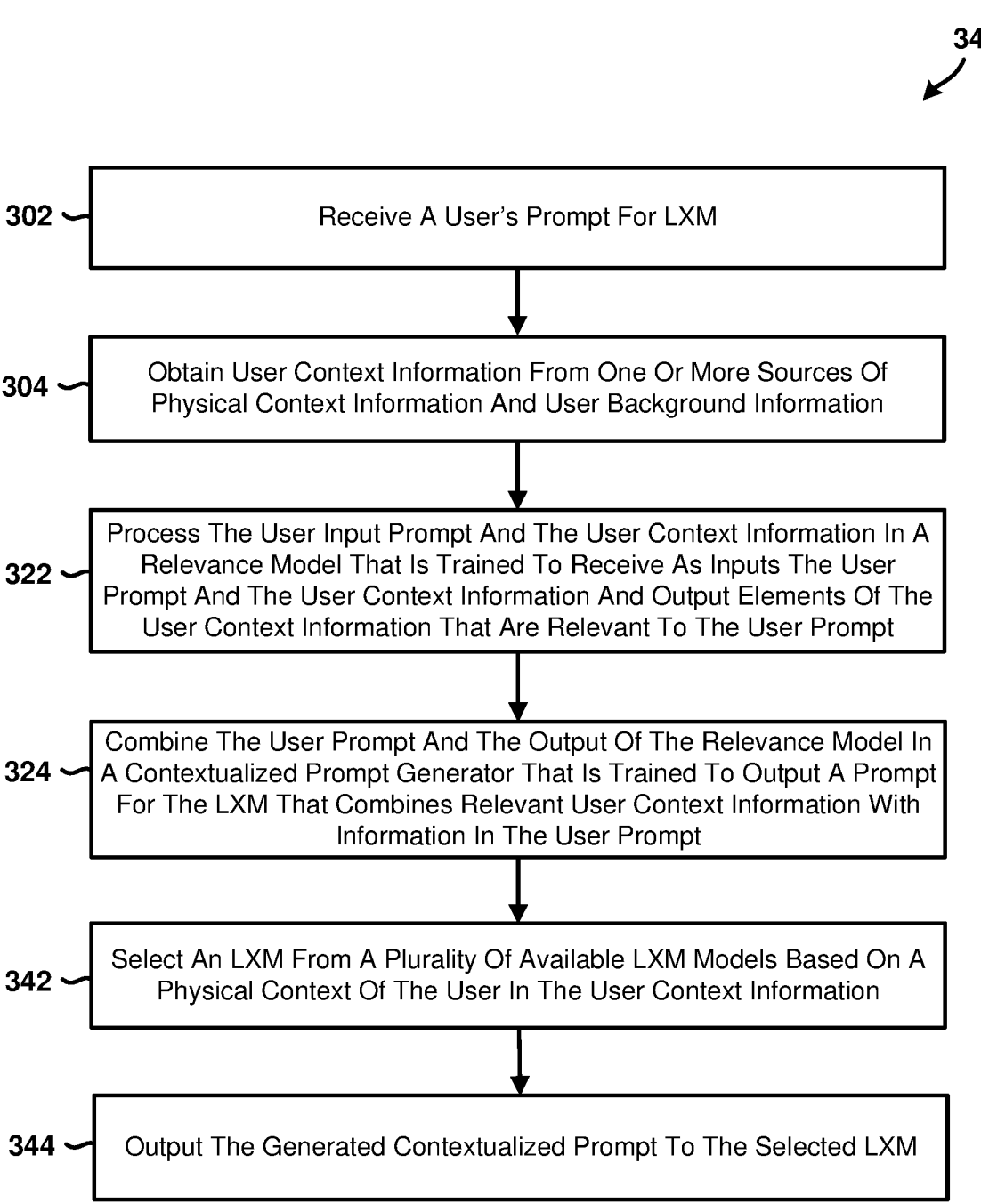

340

302 — Receive A User's Prompt For LXM

304 — Obtain User Context Information From One Or More Sources Of Physical Context Information And User Background Information 322 — Process The User Input Prompt And The User Context Information In A Relevance Model That Is Trained To Receive As Inputs The User Prompt And The User Context Information And Output Elements Of The User Context Information That Are Relevant To The User Prompt 324 — Combine The User Prompt And The Output Of The Relevance Model In A Contextualized Prompt Generator That Is Trained To Output A Prompt For The LXM That Combines Relevant User Context Information With Information In The User Prompt 342 — Select An LXM From A Plurality Of Available LXM Models Based On A Physical Context Of The User In The User Context Information 344 — Output The Generated Contextualized Prompt To The Selected LXM

FIG. 3E

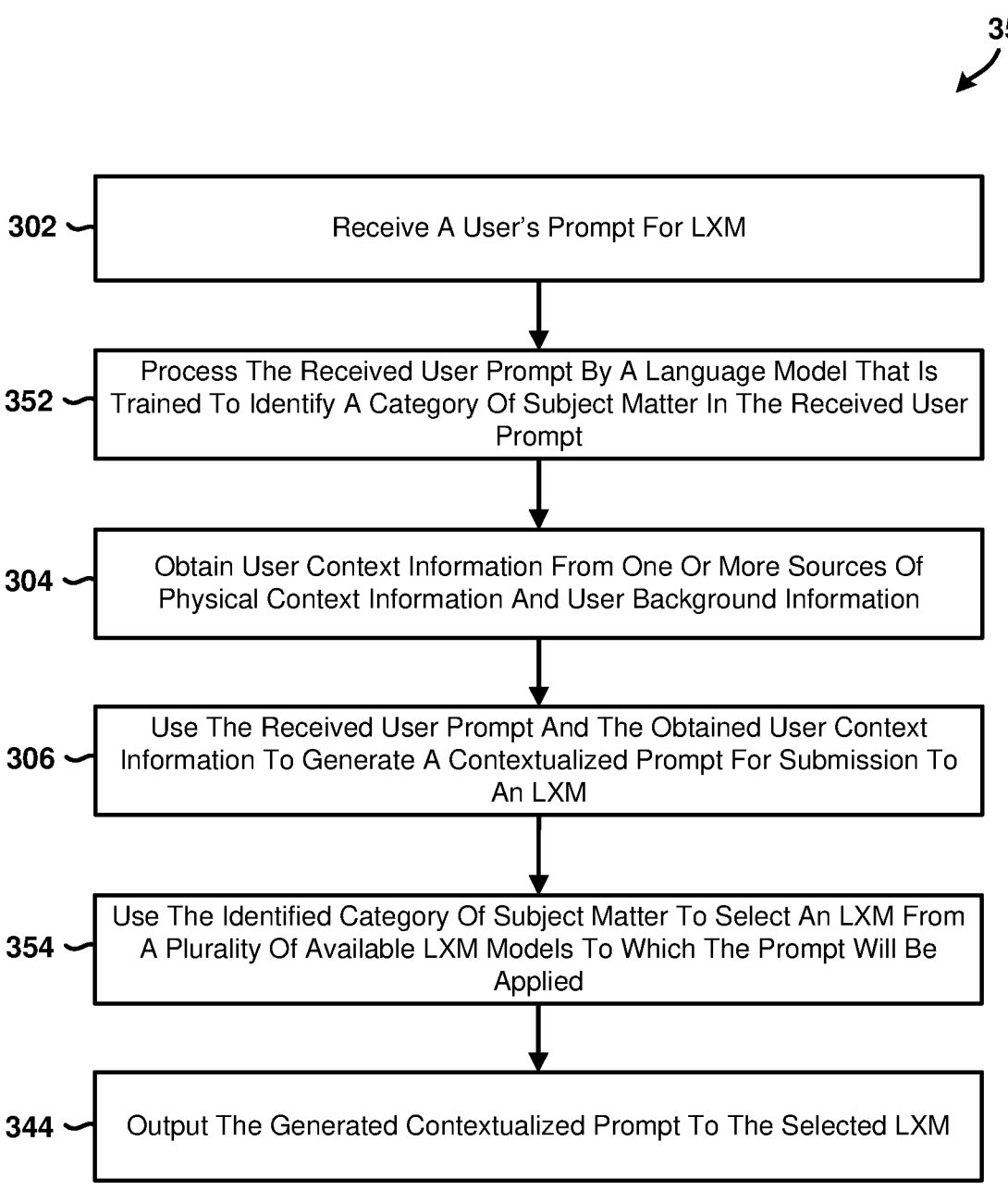

350

302 — Receive A User's Prompt For LXM

352 — Process The Received User Prompt By A Language Model That Is Trained To Identify A Category Of Subject Matter In The Received User Prompt 304 — Obtain User Context Information From One Or More Sources Of Physical Context Information And User Background Information 306 — Use The Received User Prompt And The Obtained User Context Information To Generate A Contextualized Prompt For Submission To An LXM 354 — Use The Identified Category Of Subject Matter To Select An LXM From A Plurality Of Available LXM Models To Which The Prompt Will Be Applied 344 — Output The Generated Contextualized Prompt To The Selected LXM

FIG. 3F

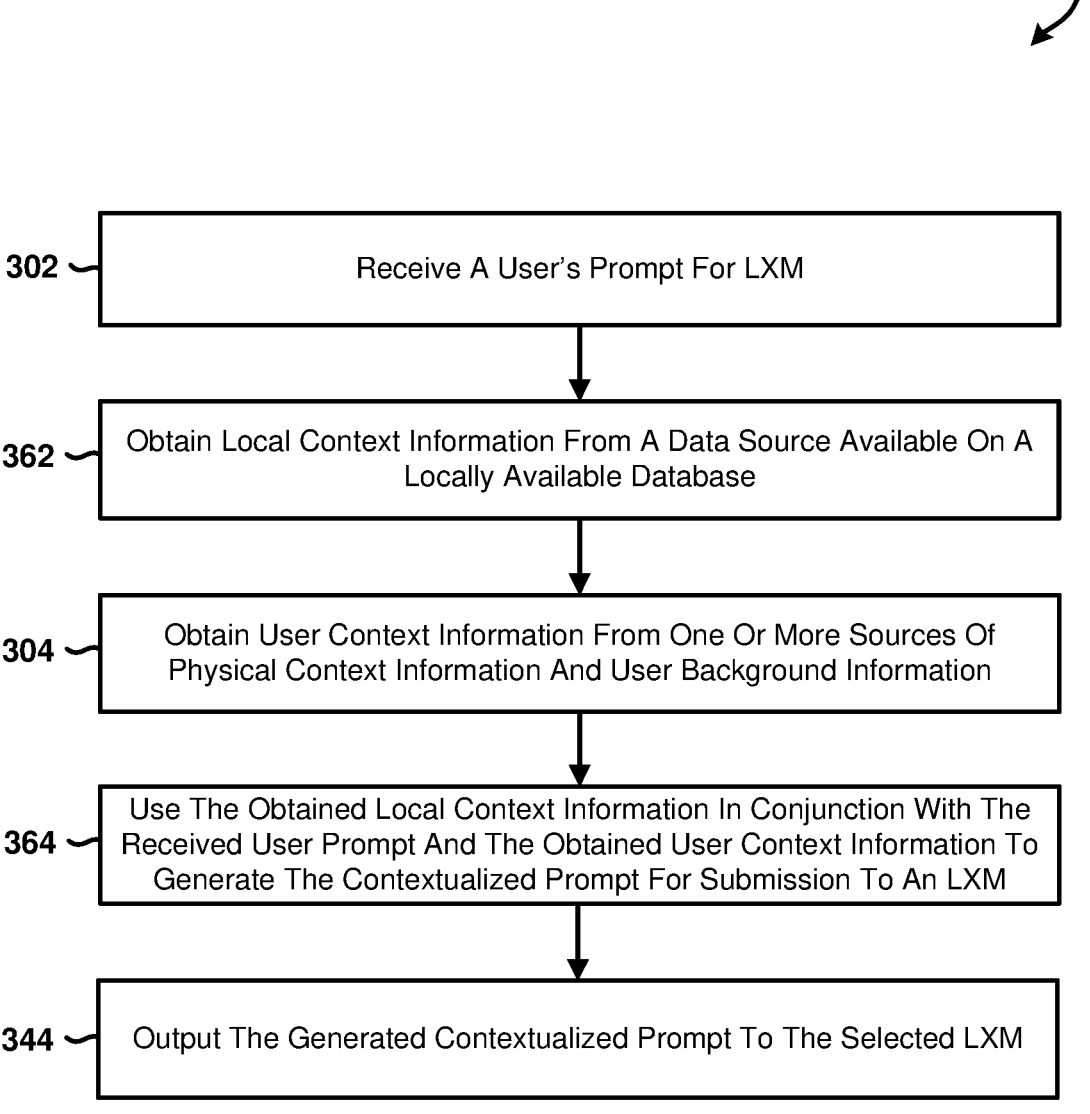

360

302 — Receive A User's Prompt For LXM

362 — Obtain Local Context Information From A Data Source Available On A Locally Available Database 304 — Obtain User Context Information From One Or More Sources Of Physical Context Information And User Background Information 364 — Use The Obtained Local Context Information In Conjunction With The Received User Prompt And The Obtained User Context Information To Generate The Contextualized Prompt For Submission To An LXM 344 — Output The Generated Contextualized Prompt To The Selected LXM

FIG. 3G

402 — Receive A Prompt For The LXM From A User

404 — Process The Prompt To Recognize Whether The Prompt Includes Privacy Information Or Cause An LXM To Provide A Response That Will Reveal Privacy Information 406 — Use The LXM To Provide A Response To The Prompt From The User In A Manner That Will Avoid Disclosure Of Privacy Information

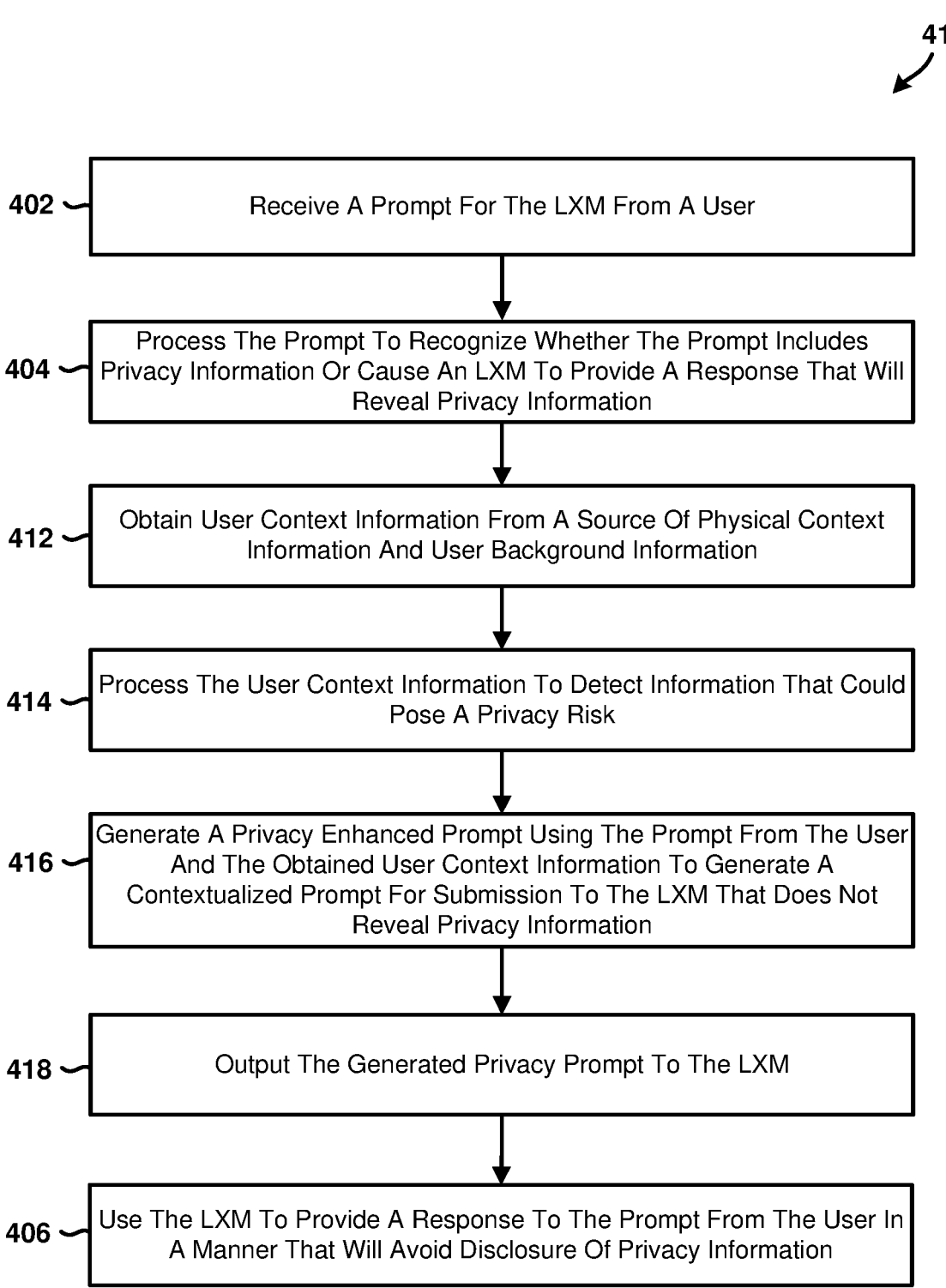

410

402 — Receive A Prompt For The LXM From A User

404 — Process The Prompt To Recognize Whether The Prompt Includes Privacy Information Or Cause An LXM To Provide A Response That Will Reveal Privacy Information 412 — Obtain User Context Information From A Source Of Physical Context Information And User Background Information 414 — Process The User Context Information To Detect Information That Could Pose A Privacy Risk 416 — Generate A Privacy Enhanced Prompt Using The Prompt From The User And The Obtained User Context Information To Generate A Contextualized Prompt For Submission To The LXM That Does Not Reveal Privacy Information 418 — Output The Generated Privacy Prompt To The LXM 406 — Use The LXM To Provide A Response To The Prompt From The User In A Manner That Will Avoid Disclosure Of Privacy Information

FIG. 4B

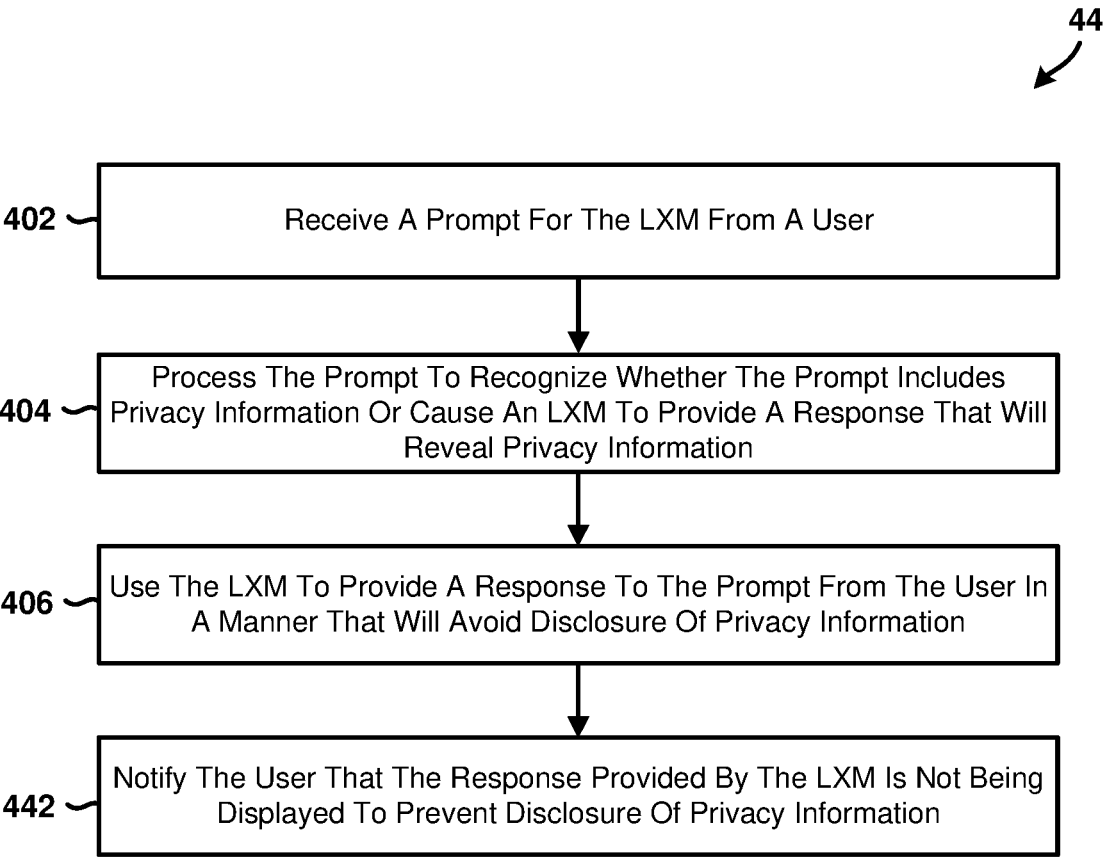

402 — Receive A Prompt For The LXM From A User

404 — Process The Prompt To Recognize Whether The Prompt Includes Privacy Information Or Cause An LXM To Provide A Response That Will Reveal Privacy Information 406 — Use The LXM To Provide A Response To The Prompt From The User In A Manner That Will Avoid Disclosure Of Privacy Information 442 — Notify The User That The Response Provided By The LXM Is Not Being Displayed To Prevent Disclosure Of Privacy Information

PRIVACY ENHANCED LANGUAGE MODEL PROMPT

BACKGROUND

Recent advancements in artificial intelligence (AI) and machine learning (ML) technologies have led to the development of increasingly sophisticated models capable of understanding and interpreting complex data structures. These models, commonly known as large generative AI models (LXMs), have a multitude of applications that span across various domains, from natural language processing to computer vision and speech recognition. Their efficacy stems from their ability to learn from massive datasets, gaining an unprecedented depth of understanding and applicability.

The increasing capabilities of LXMs, including (but not limited to) Large Language Models (LLMs), Large Speech Models (LSMs), and Large Vision Models (LVMs) (which are also referred to as Language Vision Models or Vision Language Models (VLMs)), offer enhanced functionality in various applications such as natural language understanding, speech recognition, visual analysis, text generation, speech generation, image generation, and/or the like. Among the diverse types of LXMs, LLMs are generally known for their capabilities in understanding and generating human language. These models may be trained on extensive textual datasets and may perform such tasks as machine translation, text summarization, question-answering, and/or the like. LLMs have found applications in a broad range of industries including healthcare, finance, and customer service, among others.

An LSM is a type of LXM specializing in processing and understanding auditory data. LSMs may translate spoken language into textual form and vice versa. LSMs excel at tasks such as speech-to-text conversion, voice recognition, natural language understanding within a spoken context, providing spoken word responses in machine-generated voices, and/or the like. The efficacy of LSMs lies in their capacity to learn from enormous datasets containing diverse accents, dialects, and languages.

An LVM is a LXM that is trained to interpret and analyze visual data. LVM models may use convolutional neural networks or similar architectures to process visual inputs and derive meaningful conclusions from them. From image classification to object detection and generating new images in response to natural language prompts, LVMs are growing in popularity and use in diverse areas such as medical imaging, autonomous vehicles, surveillance systems, advertising, and entertainment.

SUMMARY

Various aspects include methods of generating a prompt for a large generative artificial intelligence model (LXM), which may include receiving a user prompt from a user, processing the user prompt to recognize whether the user prompt may include privacy information or will cause the LXM to provide a response that will reveal the privacy information, and utilizing the LXM to provide a response to the user prompt in a manner that will avoid disclosure of the privacy information. In some aspects, processing the user prompt to recognize whether the prompt includes the privacy information or will cause the LXM to provide the response that will reveal the privacy information may include processing the user prompt in a trained model that has been trained to recognize the privacy information In some aspects, utilizing the LXM to provide the response to the user prompt in the manner that will avoid the disclosure of the privacy information may include selecting a locally-hosted LXM in response to recognizing that the user prompt may include the privacy information.

In some aspects, utilizing the LXM to provide the response to the user prompt in the manner that will avoid the disclosure of the privacy information may include generating a privacy enhanced prompt that will cause the LXM to respond without revealing the privacy information, and submitting the privacy enhanced prompt to the LXM. In some aspects, utilizing the LXM to provide the response to the user prompt in the manner that will avoid the disclosure of the privacy information may include determining whether the user is in a non-private location, generating a privacy enhanced prompt that may be phrased to cause the LXM to respond without revealing the privacy information, and submitting the privacy enhanced prompt to the LXM.

In some aspects, utilizing the LXM to provide the response to the user prompt in the manner that will avoid the disclosure of the privacy information may include generating a privacy enhanced prompt using the user prompt and the user context information to generate a contextualized prompt for submission to the LXM that does not reveal the privacy information, and outputting the privacy enhanced prompt to the LXM. In some aspects, utilizing the LXM to provide the response to the user prompt in the manner that will avoid the disclosure of the privacy information may include generating a privacy enhanced prompt that may be phrased so that the LXM will generate the prompt that will not reveal the privacy information related to the user in response to determining that the user may be in the location where the response to the user prompt from the LXM could be viewed by others, and outputting the privacy enhanced prompt to the LXM.

In some aspects, utilizing the LXM to provide the response to the user prompt in the manner that will avoid the disclosure of the privacy information may include reviewing the response to the user prompt provided by the LXM to determine whether the response to the user prompt would reveal the privacy information in response to determining that the user may be in the location where the response to the user prompt from the LXM could be viewed by others, and preventing presentation of the response to the user prompt provided by the LXM.

In some aspects, utilizing the LXM to provide the response to the user prompt in the manner that will avoid the disclosure of the privacy information may include presenting the user prompt to the LXM multiple times, receiving multiple different responses from the LXM, obtaining user context information from a source of physical context information and user background information, evaluating the received multiple different responses based on the user context information and the user prompt to identify one of the received multiple different responses that best responds to the user prompt, and presenting the identified one of the received multiple different responses to the user. Some aspects may further include obtaining local context information from a data source available on a local context database, and using the obtained local context information in conjunction with the user prompt to provide the response to the user prompt in the manner that will avoid the disclosure of the privacy information.

Further aspects may include a computing device having at least one processor coupled to memory and configured with processor-executable instructions to perform various operations corresponding to the methods summarized above.

Further aspects may include a non-transitory processor-readable storage medium having stored thereon processor-executable instructions configured to cause at least one processor to perform various operations corresponding to the method operations summarized above. Further aspects may include a computing device having various means for performing functions corresponding to the method operations summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features herein.

FIGS. 3A-3G are process flow diagrams illustrating methods of generating a contextualized prompt for an LXM in accordance with some embodiments.

FIGS. 4A-4E are process flow diagrams illustrating methods of generating a privacy-enhanced prompt for an LXM in accordance with some embodiments.

DETAILED DESCRIPTION

Figure 1:
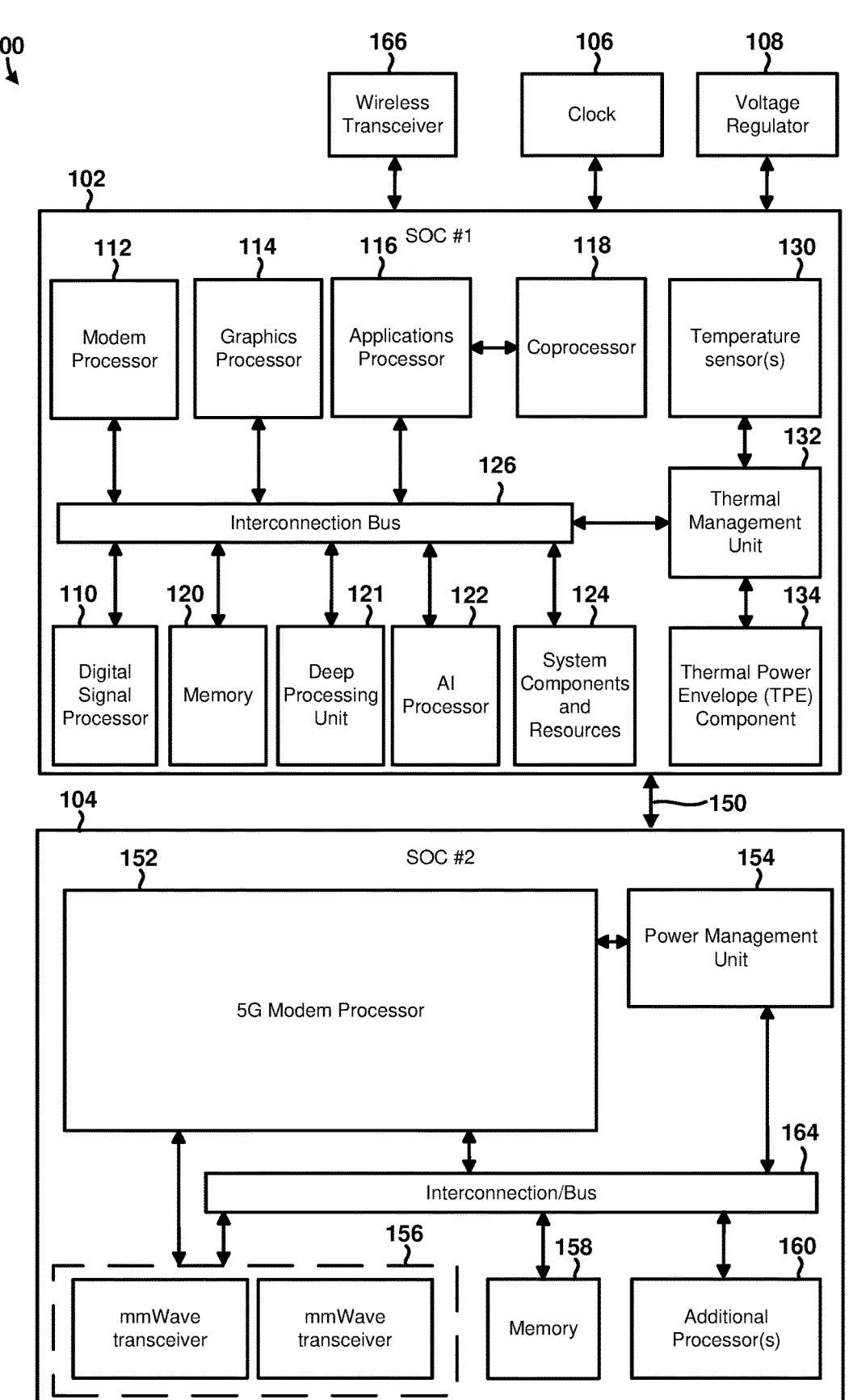
FIG. 1 is a component block diagram illustrating example components in a system in package (SIP) that may be included in a computing device and configured to implement some embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices configured to implement the methods, of generating a prompt for a large generative AI model (LXM), such as a large language model (LLM), large speech model (LSMs), large/language vision model (LVM), hybrid model, multimodal model, etc. A computing device may be equipped with components configured to receive a user prompt, obtain user context information from one or more sources of physical context information and user background information, use the received user prompt and the obtained user context information to generate a contextualized prompt for submission to an LXM, and output the generated contextualized prompt to the LXM.

In some embodiments, the computing device may be configured to improve the quality and relevance of the output or responses received from an LXM by capturing a user's text-based prompt or statement as a user prompt, categorizing the subject matter of the user prompt, extracting relevant context about the user, applying the information to a lightweight machine learning model (e.g., a profile summary model, etc.) that converts the raw contextual data into a format that is more conducive for integration with the original user prompt, selecting a suitable relevance model from a set of pre-trained models based on the categorized subject matter in the user prompt, applying the user prompt and the output of the lightweight machine learning model to the selected relevance model, determining the elements of the processed context that are relevant to the subject matter in the user prompt based on the output of the selected relevance model, filtering the context data to (only) include the elements determined to be relevant to the subject matter in the user prompt, generating a contextualized prompt by applying the user prompt and the filtered contextual data to a contextualized prompt generator, determining and selecting the most appropriate LXM for the contextualized prompt based on the physical context of the user, the subject matter of the original prompt, etc., and/or submitting the contextualized prompt to the selected LXM. In some embodiments, the computing device may extract relevant context about the user by accessing a user profile summary table stored in memory. In some embodiments, the user profile summary table may include historical data such as past prompts, instantaneous data such as current geographic location, history of instantaneous data (which may be computed based on specific pattern of instantaneous data over time), etc. In some embodiments, the contextualized prompt generator may be a machine learning model trained to create prompts that are tailored to elicit specific types of responses from the selected LXM.

In some embodiments, the computing device may be configured to receive a user prompt from a user, process the user prompt to recognize whether the user prompt includes privacy information or will cause the LXM to provide a response that will reveal the privacy information, and utilize the LXM to provide a response to the user prompt in a manner that will avoid disclosure of the privacy information. The computing device may analyze the user prompt using a trained model, and generate and use the privacy-enhanced prompt to avoid revealing sensitive information. The computing device may also use a local LXM in response to detecting privacy-sensitive information, assess the user's location to further tailor the prompt (e.g., for public or semi-public settings, etc.), generate contextualized prompts that maintain privacy and merge user and context information, review LXM-generated responses to ensure that the do not reveal privacy-sensitive information, prevent the presentation of privacy-sensitive information, iteratively present prompts to the LXM, evaluate multiple responses, and/or select an appropriate response based on user context and other factors.

By generating enhanced prompts (e.g., contextualized prompts, privacy enhanced prompts, etc.), various embodiments may improve or optimize the output from LXMs. The embodiments may improve the performance and functionality of the computing device by offering users additional privacy protections and an improved, more tailored, and more efficient user experience without having a significant negative impact on the performance or power consumption characteristics of the computing device. For example, in addition to enhancing privacy, this approach may lead to potential cost savings by reducing the average number of tokens used in conversations with the LXM.

The term "computing device" is used herein to refer to (but not limited to) any one or all of personal computing devices, personal computers, workstations, laptop computers, Netbooks, Ultrabook, tablet computers, mobile communication devices, smartphones, user equipment (UE), personal data assistants (PDAs), palm-top computers, wireless electronic mail receivers, multimedia internet-enabled cellular telephones, media and entertainment systems, gaming systems (e.g., PlayStation™, Xbox™, Nintendo Switch™), media players (e.g., DVD players, Roku™, apple TV™), digital video recorders (DVRs), portable projectors, 3D holographic displays, wearable devices (e.g., earbuds, smartwatches, fitness trackers, augmented reality (AR) glasses, head-mounted displays, etc.), vehicle systems such as drones, automobiles, motorcycles, connected vehicles, electric vehicles, automotive displays, advanced driver-assistance systems (ADAS), etc., cameras (e.g., surveillance cameras, embedded cameras), smart devices (e.g., smart light bulbs, smartwatches, thermostats, smart glasses, etc.), Internet of Things (IoT) devices, other similar devices that include a programmable processor or processing system that may be configured to provide the functionality of various embodiments.

The term "processing system" is used herein to refer to one more processors, including multi-core processors, that are organized and configured to perform various computing functions. Various embodiment methods may be implemented in one or more of multiple processors within a processing system as described herein.

The term "system on chip" (SoC) is used herein to refer to a single integrated circuit (IC) chip that contains multiple resources or independent processors integrated on a single substrate. A single SoC may contain circuitry for digital, analog, mixed-signal, and radio-frequency functions. A single SoC may include at least one processor of a processing system that includes any number of general-purpose or specialized processors (e.g., network processors, digital signal processors, modem processors, video processors, etc.), memory blocks (e.g., ROM, RAM, Flash, etc.), and resources (e.g., timers, voltage regulators, oscillators, etc.). For example, an SoC may include an applications processor that operates as the SoC's main processor, central processing unit (CPU), microprocessor unit (MPU), arithmetic logic unit (ALU), etc. An SoC processing system also may include software for controlling integrated resources and processors, as well as for controlling peripheral devices.

The term "system in a package" (SIP) is used herein to refer to a single module or package that contains multiple resources, computational units, cores, or processors on two or more IC chips, substrates, or SoCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high-speed communication circuitry and packaged in close proximity, such as on a single motherboard, in a single UE, or in a single CPU device. The proximity of the SoCs facilitates high-speed communications and the sharing of memory and resources.

The term "neural network" is used herein to refer to an interconnected group of processing nodes (or neuron models) that collectively operate as a software application or process that controls a function of a computing device and/or generates an overall inference result as output. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and output data. A neural network may learn to perform new tasks over time by adjusting these weight values. In some cases, the overall structure of the neural network and/or the operations of the processing nodes do not change as the neural network learns a task. Rather, learning is accomplished during a "training" process in which the values of the weights in each layer are determined. As an example, the training process may include causing the neural network to process a task for which an expected/desired output is known, comparing the activations generated by the neural network to the expected/desired output, and determining the values of the weights in each layer based on the comparison results. After the training process is complete, the neural network may begin "inference" to process a new task with the determined weights.

The term "inference" is used herein to refer to a process that is performed at runtime or during the execution of the software application program corresponding to the neural network. Inference may include traversing the processing nodes in the neural network along a forward path to produce one or more values as an overall activation or overall "inference result."

Deep neural networks implement a layered architecture in which the activation of a first layer of nodes becomes an input to a second layer of nodes, the activation of a second layer of nodes becomes an input to a third layer of nodes, and so on. As such, computations in a deep neural network may be distributed over a population of processing nodes that make up a computational chain. Deep neural networks may also include activation functions and sub-functions (e.g., a rectified linear unit that cuts off activations below zero, etc.) between the layers. The first layer of nodes of a deep neural network may be referred to as an input layer. The final layer of nodes may be referred to as an output layer. The layers in-between the input and final layer may be referred to as intermediate layers, hidden layers, or black-box layers.

Each layer in a neural network may have multiple inputs and thus multiple previous or preceding layers. Said another way, multiple layers may feed into a single layer. For ease of reference, some of the embodiments are described with reference to a single input or single preceding layer. However, it should be understood that the operations disclosed and described in this application may be applied to each of multiple inputs to a layer and multiple preceding layers.

The term "recurrent neural network" (RNN) is used herein to refer to a class of neural networks particularly well-suited for sequence data processing. Unlike feedforward neural networks, RNNs may include cycles or loops within the network that allow information to persist. This enables RNNs to maintain a "memory" of previous inputs in the sequence, which may be beneficial for tasks in which temporal dynamics and the context in which data appears are relevant.

The term "long short-term memory network" (LSTM) is used herein to refer to a specific type of RNN that addresses some of the limitations of basic RNNs, particularly the vanishing gradient problem. LSTMs include a more complex recurrent unit that allows for the easier flow of gradients during backpropagation. This facilitates the model's ability to learn from long sequences and remember over extended periods, making it apt for tasks such as language modeling, machine translation, and other sequence-to-sequence tasks.

The term "transformer" is used herein to refer to a specific type of neural network that includes an encoder and/or a decoder and is particularly well-suited for sequence data processing. Transformers may use multiple self-attention components to process input data in parallel rather than sequentially. The self-attention components may be configured to weigh different parts of an input sequence when producing an output sequence. Unlike solutions that focus on the relationship between elements in two different sequences, self-attention components may operate on a single input sequence. The self-attention components may compute a weighted sum of all positions in the input sequence for each position, which may allow the model to consider other parts of the sequence when encoding each element. This may offer advantages in tasks that benefit from understanding the contextual relationships between elements in a sequence, such as sentence completion, translation, and summarization. The weights may be learned during the training phase, allowing the model to focus on the most contextually relevant parts of the input for the task at hand. Transformers, with their specialized architecture for handling sequence data and their capacity for parallel computation, often serve as foundational elements in constructing large generative AI models (LXM).

The term "large generative AI model" (LXM) is used herein to refer to an advanced computational framework that includes any of a variety of specialized AI models including, but not limited to, large language models (LLMs), large speech models (LSMs), large/language vision models (LVMs), vision language models (VLMs)), hybrid models, and multi-modal models. An LXM may include multiple layers of neural networks (e.g., RNN, LSTM, transformer, etc.) with millions or billions of parameters. Unlike traditional systems that translate user prompts into a series of correlated files or web pages for navigation, LXMs support dialogic interactions and encapsulate expansive knowledge in an internal structure. As a result, rather than merely serving a list of relevant websites, LXMs are capable of providing direct answers and/or are otherwise adept at various tasks, such as text summarization, translation, complex question-answering, conversational agents, etc. In various embodiments, LXMs may operate independently as standalone units, may be integrated into more comprehensive systems and/or into other computational units (e.g., those found in a SoC or SIP, etc.), and/or may interface with specialized hardware accelerators to improve performance metrics such as latency and throughput. In some embodiments, the LXM component may be enhanced with or configured to perform an adaptive algorithm that allows the LXM to better understand context information and dynamic user behavior. In some embodiments, the adaptive algorithms may be performed by the same processing system that manages the core functionality of the LXM and/or may be distributed across multiple independent processing systems.

The performance and efficacy of an LXM system may depend on the quality and relevance of the context of the input, which is often a textual prompt that ranges from 4,000 to 500,000 tokens. There are limitations on the total number of tokens that may be processed by LXM AI models. As an example, a model with a limitation of 10,000 tokens may alter or truncate input sequences that go beyond this specific count. Aligning the prompt with the user's environment or actions is a considerable technical challenge that may directly affect the relevance and accuracy of the LXM output.

The term "lightweight language model" (also referred to a first tier or type of language model, or a lightweight profile summary model, etc.) is used herein to refer to a subclass of LXMs that include or use a relatively small number of parameters (e.g., hundreds of thousands to tens of millions of parameters) and/or tokens (e.g., dozens to a few hundred). Lightweight language models may be trained or optimized for specific tasks for which privacy or computational efficiency is a priority. The lightweight nature allows for quicker deployment and reduced latency during the inference stage, making them suitable for real-time applications or environments with limited computational resources. For example, a lightweight language model may be well-suited for embedded systems, mobile computing device, and IoT devices. In some embodiments, lightweight language models may operate in tandem with more resource-intensive models, offloading certain tasks to optimize overall system performance. Some embodiments may include or use a lightweight profile summary model, which may be an instance of a lightweight language model.

The term "middleweight language model" (also referred to as a second tier or type of language model) is used herein to refer to a subclass of LXMs that include or use a modest number of parameters (e.g., hundreds of millions to a few billion parameters, etc.). In various embodiments, a middleweight language model may generally be larger in size parameters, computational complexity, accuracy, etc. compared to a lightweight language model. These models generally offer a balanced trade-off between computational complexity and predictive accuracy. Often, middleweight language models are used in applications where higher accuracy is desirable but the computational resources are not as extensive as those needed for robust models. For example, a middleweight language model may be used for services that require near real-time responses but also demand a high level of accuracy and contextual understanding.

The term "robust language model" (also referred to as a third tier or type of language) is used herein to refer to a subclass of LXMs that include or use a relatively large number of parameters (e.g., hundreds of billions to trillions to quadrillions of parameters, etc.). In various embodiments, a robust language model may generally be larger in size parameters, computational complexity, accuracy, etc. compared to a middleweight language model or a lightweight language model. Robust language models may be used for services and applications that demand high accuracy and have access to robust computational resources, such as for research, complex data analytics, high-level natural language understanding tasks, and other applications where the highest degree of accuracy is desirable. Robust language models may be integrated into the cloud, data centers or other high-performance computing environments. A robust language model may be distributed across multiple high-performance computational units to accomplish tasks that are computationally intensive. In some embodiments, robust language models may be paired with specialized hardware accelerators to further optimize performance metrics such as throughput and latency.

The term "contextualized prompt" is used herein to refer to a user-supplied input that has been augmented with additional contextual data or metadata to improve the relevance and specificity of responses received from an LXM. Unlike conventional prompts that only include a text-based query or command, a contextualized prompt may include elements such as historical interactions of the user, details about the surrounding environment, attributes particular to the device in use, geographic positioning information, user inclinations archived in a database, real-time metrics collected from sensors (such as current location and time), physiological characteristics, specifics related to the user's background, and other forms of contextual data. By integrating these and other data points into the input prompts, the embodiments may improve the relevance and completeness of the responses generated by an LXM. The embodiments also allow for the generation of answers that are more closely aligned with individual users and their prevailing conditions.

The term "privacy-enhanced prompt" is used herein to refer to a user-supplied input that has been scrutinized for potential privacy concerns and/or modified to remove sensitive information supplied by or collected from the user.

The term "relevance model" is used herein to refer to an LXM or computational unit trained to evaluate the importance or pertinence of various elements within a given set of data. In the context of generating a contextualized prompt, the relevance model may take the user prompt and the available context information as inputs and output a subset of the context information that is deemed relevant for generating a more targeted response from a more robust LXM. In some embodiments, the relevance model may be trained on a large dataset that includes a variety of user prompts and contextual elements to generalize its ability to select relevant information for different kinds of queries. In some embodiments, the relevance model and the contextualized prompt generator may be incorporated into a single, unified system, streamlining the process of creating and issuing contextualized prompts to a cloud-based LXM. In other embodiments, these components may operate independently and/or may be distributed across different computing resources.

The term "local context database" is used herein to refer to a specialized data repository stored on the user's device or in a localized network that includes private, personal and/or specific user information, such as local files, browsing history, sensor data, calendar, upcoming events, etc. Some embodiments include a contextualized prompt generator that is configured to access this local context database to obtain information that is used in generating a personalized and relevant prompt for submission to an LXM. As such, the local context database may be used to improve data privacy by limiting the transmission of sensitive data to remote servers.

In some embodiments, the content of the local context database may be selectively used or shortened to align with Q/A operations based on the analysis results generated by a local lightweight language model. Such local queries may improve efficiency and help maintain user privacy by reducing or eliminating the need to send sensitive or personal data to external servers for processing. For example, if a user's calendar or upcoming events are stored in this local knowledge base, querying them locally ensures that this personal data does not leave the user's device, thereby safeguarding the user's privacy. These local queries may also improve efficiency and reduce latency because, at times, the volume of data or information contained within the knowledge base may be extensive and sending such vast amounts of data for processing to an external server may be technically challenging, especially when considering bandwidth constraints or the need for real-time responses. In addition, not all devices may have the capability to process extensive datasets efficiently. In such cases, it may be beneficial to truncate or reduce the size of the knowledge base or local context database so that it is more manageable for the device's hardware. Some embodiments may use a "relevance model" or "relevance determination model" to retain only the most pertinent parts of the knowledge base and ensure that the knowledge base aligns better with the edge device's processing capabilities, which may allow for faster and more efficient queries and responses.

The term "embedding layer" is used herein to refer to a specialized layer within a neural network, typically at the input stage, that transforms continuous or discrete categorical values or tokens into continuous, high-dimensional vectors. An embedding layer may also transform high-dimensional data into low-dimensional vectors (e.g., using "dimensionality reduction" techniques, etc.), which may be particularly useful when the original data is complex or too large to handle efficiently. For lightweight language models, the embedding layer may convert tokens (typically low-dimensional entities) into high-dimensional vectors. An embedding layer may operate as a lookup table in which each unique token or category is mapped to a point in a continuous vector space. The vectors may be refined during the model's training phase to encapsulate the characteristics or attributes of the tokens in a manner that is conducive to the tasks the model is configured to perform.

The term "token" is used herein to refer to a unit of information that an LXM may read as a single input during training and inference. Each token may represent any of a variety of different data types. For example, in text-centric models such as in LLMs, each token may represent a one or more textual element such as a paragraph(s), sentence(s), clause(s), word(s), sub-word(s), character(s), etc. In models designed for auditory data, such as LSMs, each token may represent a feature extracted from audio signals, such as a phoneme, spectrogram, temporal dependency, Mel-frequency cepstral coefficients (MFCCs) that represent small segments of an audio waveform, etc. In visual models such as LVM, each token may correspond to a portion of an image (e.g., pixel blocks), sequences of video frames, etc. In hybrid systems that combine multiple modalities (text, speech, vision, etc.), each token may be a complex data structure that encapsulates information from various sources. For example, a token may include both textual and visual information, each of which independently contributes to the token's overall representation in the model.

Each token may be converted into a numerical vector via the embedding layer. Each vector component (e.g., numerical value, parameter, etc.) may encode an attribute, quality, or characteristic of the original token. The vector components may be adjustable parameters that are iteratively refined during the model training phase to improve the model's performance during subsequent operational phases. The numerical vectors may be high-dimensional space vectors (e.g., containing more than 300 dimensions, etc.) in which each dimension in the vector captures a unique attribute, quality, or characteristic of the token. For example, dimension 1 of the numerical vector may encode the frequency of a word's occurrence in a corpus of data, dimension 2 may represent the pitch or intensity of the sound of the word at its utterance, dimension 3 may represent the sentiment value of the word, etc. Such intricate representation in high-dimensional space may help the LXM understand the semantic and syntactic subtleties of its inputs. During the operational phase, the tokens may be processed sequentially through layers of the LXM or neural network, which may include structures or networks appropriate for sequence data processing, such as transformer architectures, recurrent neural networks (RNNs), or long short-term memory networks (LSTMs).

The term "sequence data processing" is used herein to refer to techniques or technologies for handling ordered sets of tokens in a manner that preserves their original sequential relationships and captures dependencies between various elements within the sequence. The resulting output may be a probabilistic distribution or a set of probability values, each corresponding to a "possible succeeding token" in the existing sequence. For example, in text completion tasks, the LXM may suggest the possible succeeding token determined to have the highest probability of completing the text sequence. For text generation tasks, the LXM may choose the token with the highest determined probability value to augment the existing sequence, which may subsequently be fed back into the model for further text production.

Various embodiments include computing devices equipped with components that are configured to mitigate the above-described technical challenges to improve the performance and efficacy of the LXM system and user computing devices that use the LXM system. Embodiment components may improve the quality, caliber, pertinence, and/or relevance of the input context without having a significant negative or user-perceivable impact on the performance or energy consumption characteristics of the computing device.

Various embodiments may be implemented on a number of single-processor and multiprocessor computer systems, including a system-on-chip (SOC) or system in a package (SIP). FIG. 1 illustrates an example computing system or SIP 100 architecture that may be used in mobile computing devices implementing a continuous speech-monitoring artificial intelligence (AI) system in accordance with various embodiments.

With reference to FIG. 1, the illustrated example SIP 100 includes two SOCs 102, 104, a clock 106, a voltage regulator 108, and a wireless transceiver 166. The first and second SOC 102, 104 may communicate via interconnection bus 150. Various processors 110, 112, 114, 116, 118, 121, 122, may be interconnected to each other and to one or more memory elements 120, system components and resources 124, and a thermal management unit 132 via an interconnection bus 126, which may include advanced interconnects such as high-performance networks-on-chip (NOCs). Similarly, the processor 152 may be interconnected to the power management unit 154, the mmWave transceivers 156, memory 158, and various additional processors 160 via the interconnection bus 164. These interconnection buses 126, 150, 164 may include an array of reconfigurable logic gates and/or implement a bus architecture (e.g., CoreConnect, AMBA, etc.). Communications may be provided by advanced interconnects, such as NOCs.

In various embodiments, any, or all of the processors 110, 112, 114, 116, 121, 122, in the system may operate as the SoC's main processor, central processing unit (CPU), microprocessor unit (MPU), arithmetic logic unit (ALU), etc. One or more of the coprocessors 118 may operate as the CPU.

In some embodiments, the first SOC 102 may operate as the central processing unit (CPU) of the mobile computing device that carries out the instructions of software application programs by performing the arithmetic, logical, control and input/output (I/O) operations specified by the instructions. In some embodiments, the second SOC 104 may operate as a specialized processing unit. For example, the second SOC 104 may operate as a specialized 5G processing unit responsible for managing high volume, high speed (e.g., 5 Gbps, etc.), and/or very high-frequency short wavelength (e.g., 28 GHz mmWave spectrum, etc.) communications.

The first SOC 102 may include a digital signal processor (DSP) 110, a modem processor 112, a graphics processor 114, an application processor 116, one or more coprocessors 118 (e.g., vector co-processor, CPUCP, etc.) connected to one or more of the processors, memory 120, deep processing unit (DPU) 121, artificial intelligence processor 122, system components and resources 124, an interconnection bus 126, one or more temperature sensors 130, a thermal management unit 132, and a thermal power envelope (TPE) component 134. The second SOC 104 may include a 5G modem processor 152, a power management unit 154, an interconnection bus 164, a plurality of mmWave transceivers 156, memory 158, and various additional processors 160, such as an applications processor, packet processor, etc.

Each processor 110, 112, 114, 116, 118, 121, 122, 121, 122, 152, 160 may include one or more cores, and each processor/core may perform operations independent of the other processors/cores. For example, the first SOC 102 may include a processor that executes a first type of operating system (e.g., FreeBSD, LINUX, OS X, etc.) and a processor that executes a second type of operating system (e.g., MICROSOFT WINDOWS 11). In addition, any, or all of the processors 110, 112, 114, 116, 118, 121, 122, 121, 122, 152, 160 may be included as part of a processor cluster architecture (e.g., a synchronous processor cluster architecture, an asynchronous or heterogeneous processor cluster architecture, etc.).

Any or all of the processors 110, 112, 114, 116, 118, 121, 122, 121, 122, 152, 160 may operate as the CPU of the mobile computing device. In addition, any, or all of the processors 110, 112, 114, 116, 118, 121, 122, 121, 122, 152, 160 may be included as one or more nodes in one or more CPU clusters. A CPU cluster may be a group of interconnected nodes (e.g., processing cores, processors, SOCs, SIPs, computing devices, etc.) configured to work in a coordinated manner to perform a computing task. Each node may run its own operating system and contain its own CPU, memory, and storage. A task that is assigned to the CPU cluster may be divided into smaller tasks that are distributed across the individual nodes for processing. The nodes may work together to complete the task, with each node handling a portion of the computation. The results of each node's computation may be combined to produce a final result. CPU clusters are especially useful for tasks that can be parallelized and executed simultaneously. This allows CPU clusters to complete tasks much faster than a single, high-performance computer. Additionally, because CPU clusters are made up of multiple nodes, they are often more reliable and less prone to failure than a single high-performance component.

The first and second SOC 102, 104 may include various system components, resources, and custom circuitry for managing sensor data, analog-to-digital conversions, wireless data transmissions, and for performing other specialized operations, such as decoding data packets and processing encoded audio and video signals for rendering in a web browser. For example, the system components and resources 124 of the first SOC 102 may include power amplifiers, voltage regulators, oscillators, phase-locked loops, peripheral bridges, data controllers, memory controllers, system controllers, Access ports, timers, and other similar components used to support the processors and software clients running on a computing device. The system components and resources 124 may also include circuitry to interface with peripheral devices, such as cameras, electronic displays, wireless communication devices, external memory chips, etc.

The first and/or second SOCs 102, 104 may further include an input/output module (not illustrated) for communicating with resources external to the SOC, such as a clock 106, a voltage regulator 108, and a wireless transceiver 166 (e.g., cellular wireless transceiver, Bluetooth transceiver, etc.). Resources external to the SOC (e.g., clock 106, voltage regulator 108, wireless transceiver 166) may be shared by two or more of the internal SOC processors/cores.

In addition to the example SIP 100 discussed above, various embodiments may be implemented in various computing systems, including a single processor, multiple processors, multicore processors, or any combination thereof.

Figure 2A:
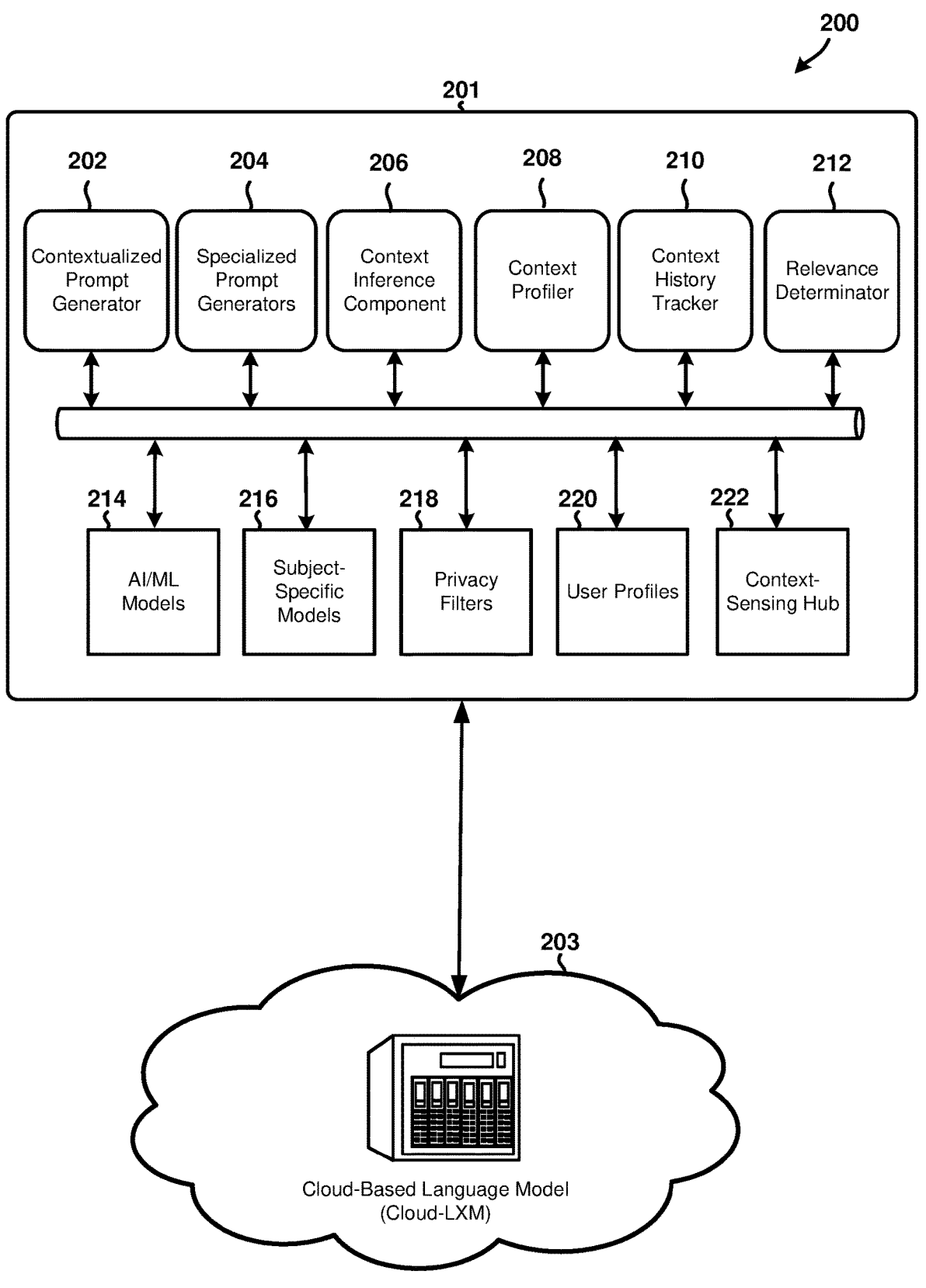
FIGS. 2A-2F are component block diagrams illustrating example functional components and subsystems in a system configured to implement some embodiments.
Figure 2B:
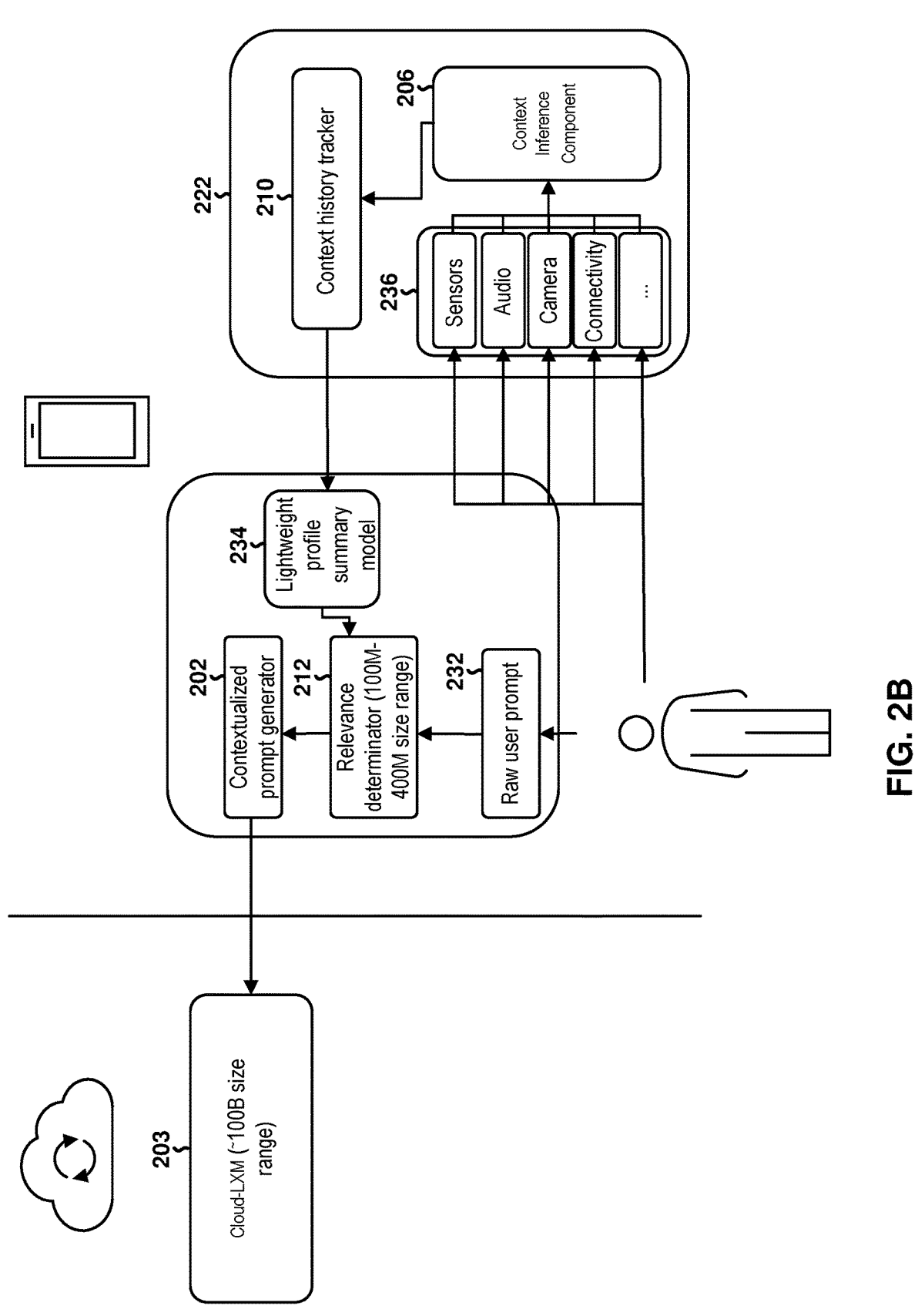
Figure 2C:
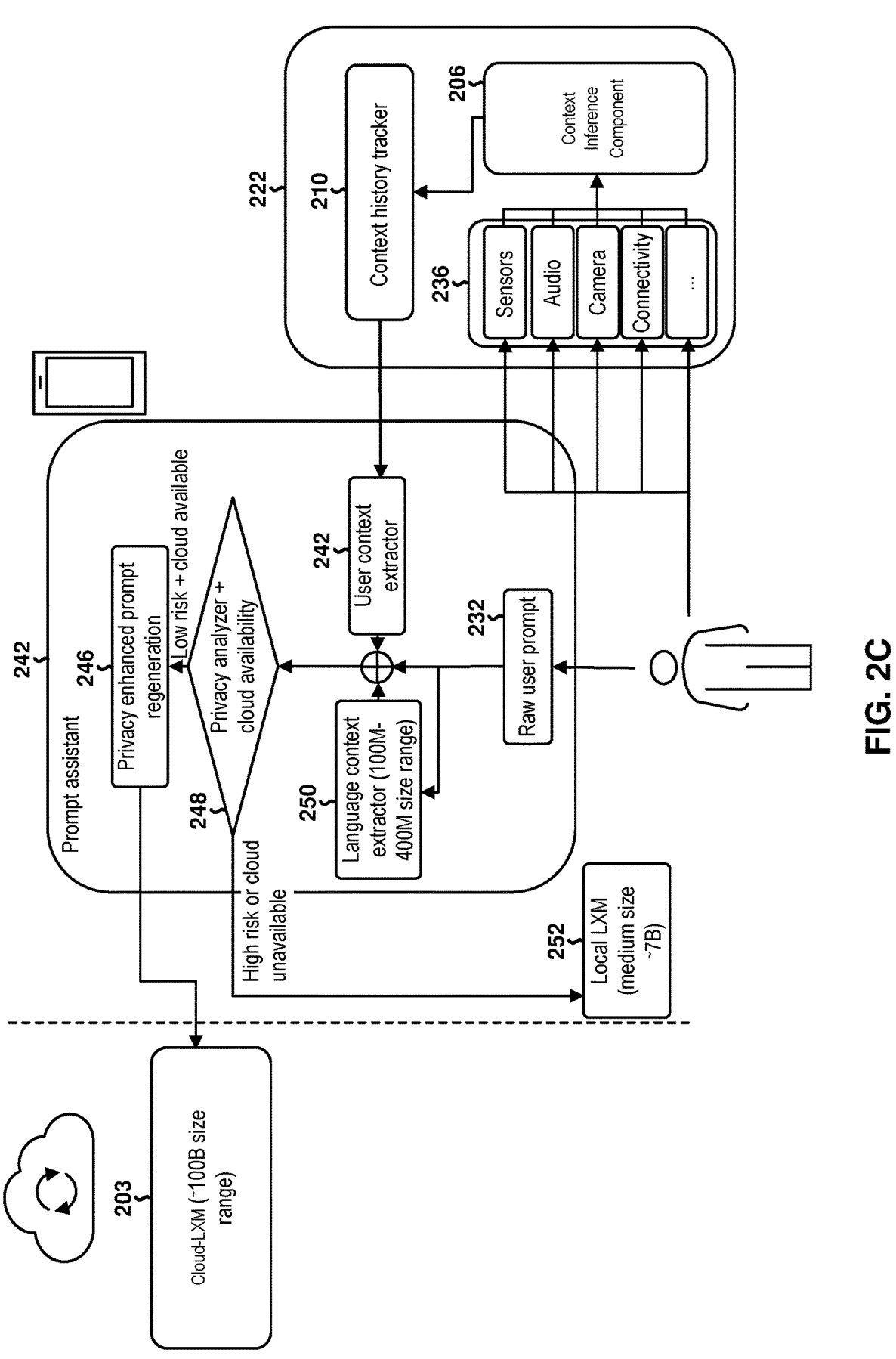
Figure 2D:
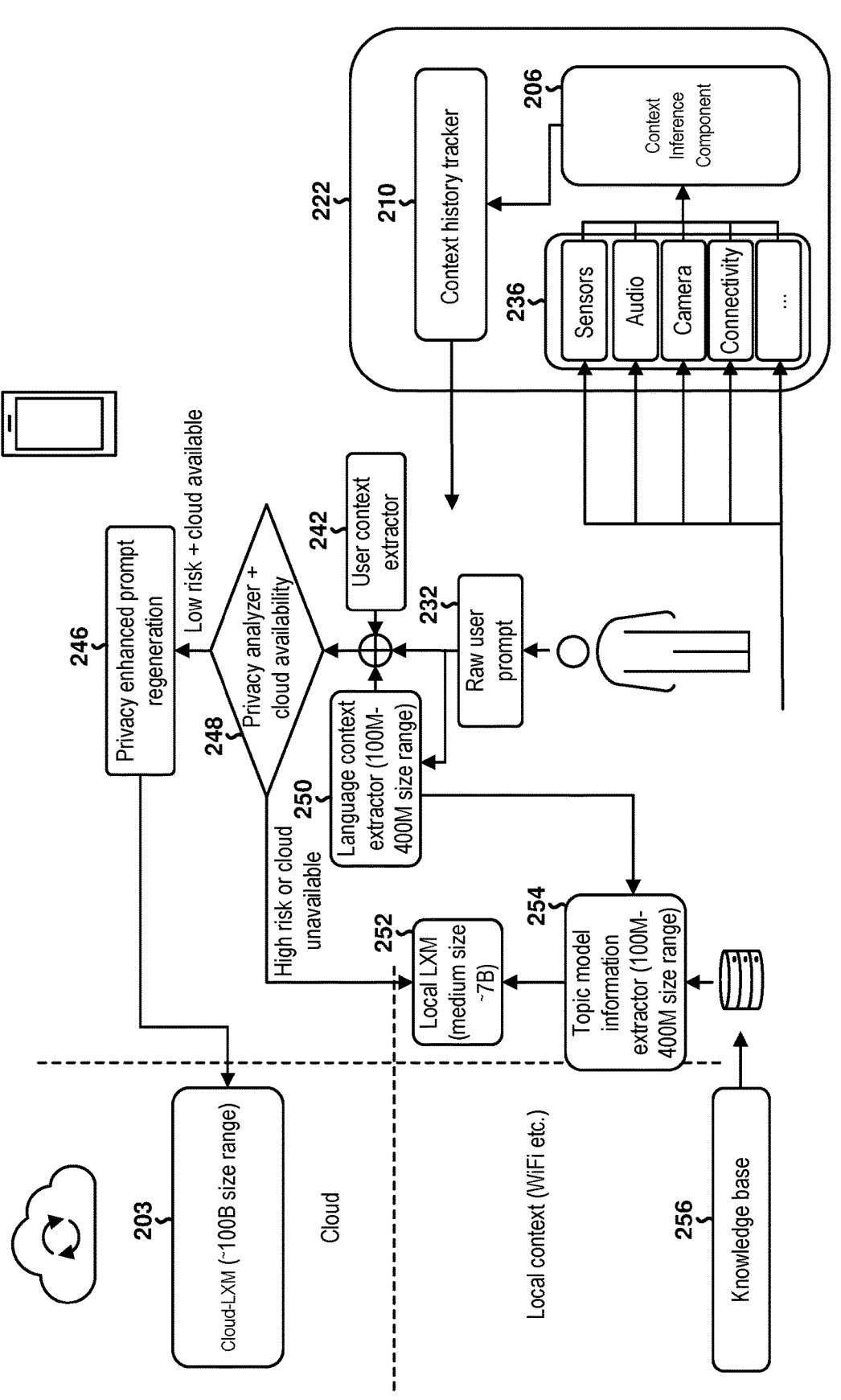
Figure 2E:
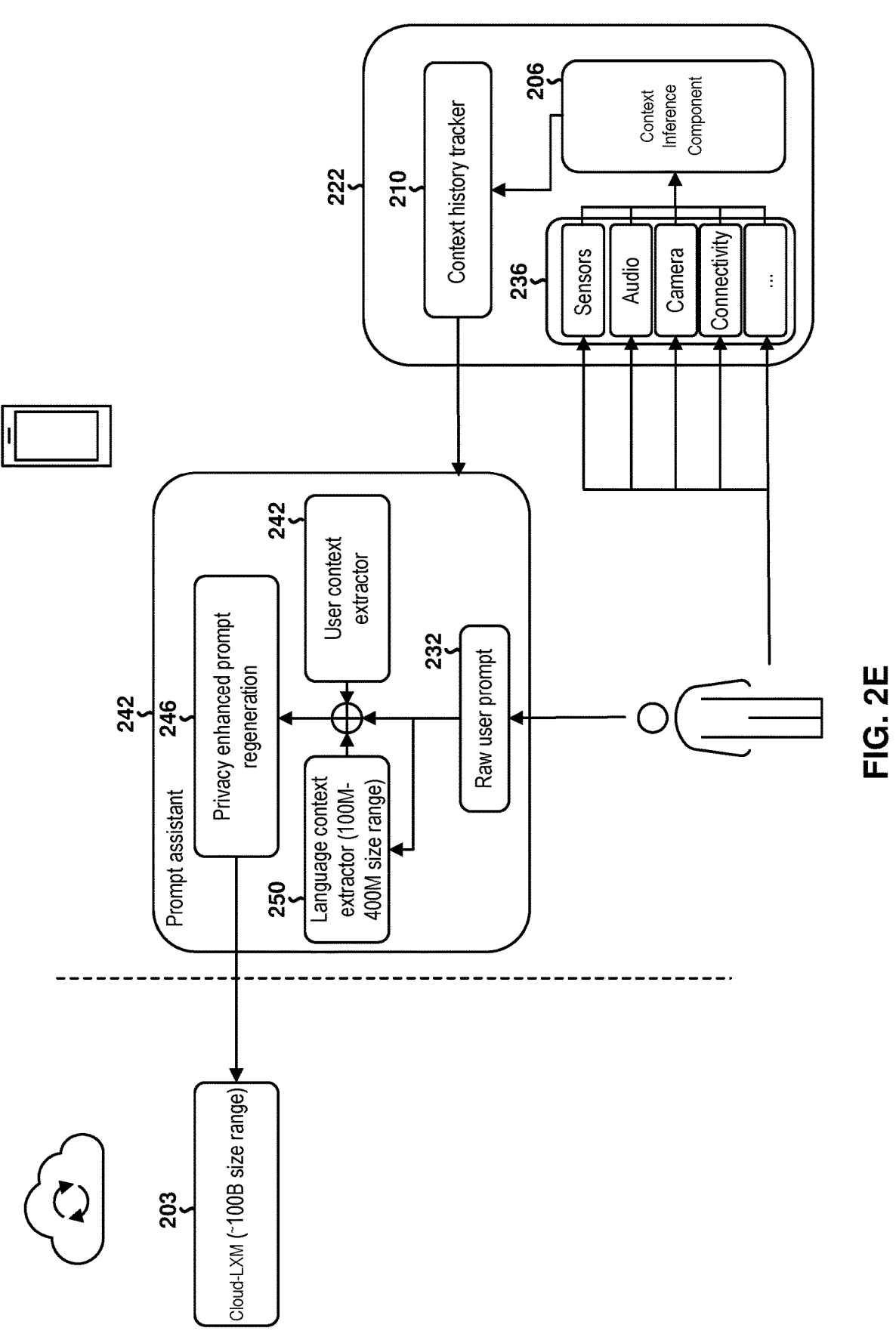
Figure 2F:
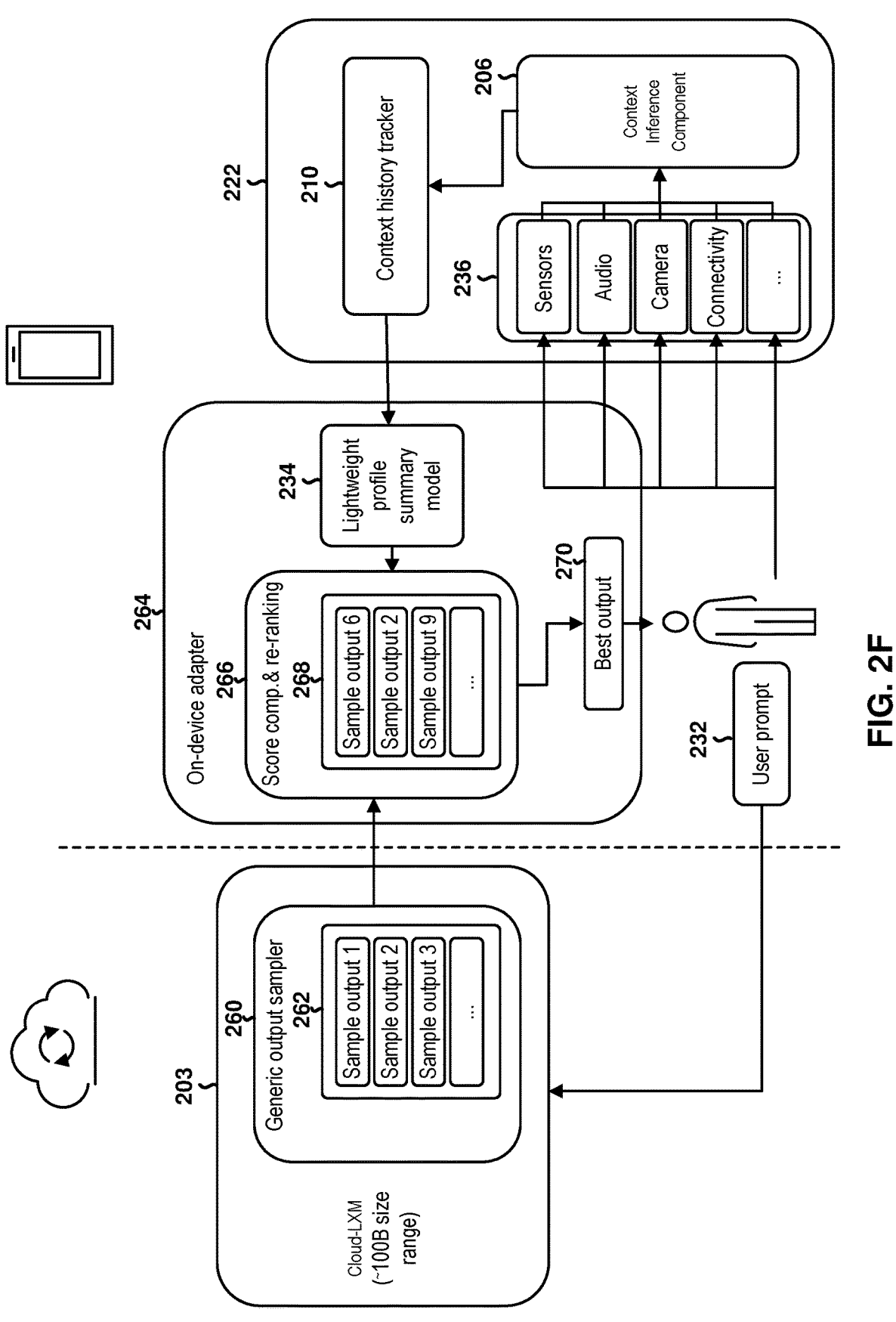

FIGS. 2A-2F illustrate example components that could be included in a system 200 configured to improve the efficacy and personalization of interactions between user devices and cloud-based LLMs by using individual user profiles for prompt optimization and to mitigate the limitations of conventional solutions that generally fine-tune language models based on generalized, population-level data in accordance with the various embodiments. With reference to FIGS. 1-2F, a system 200 may include a user computing device 201 (e.g., SIP 100, SOCs 102, 104, etc.) and a cloud-based language model (Cloud-LXM) 203 system, which may include a robust language model.

In various embodiments, the user computing device 201 may include any or all of a contextualized prompt generator 202, specialized prompt generators 204, a context inference component 206, a context profiler 208 component, a context history tracker 210 component, a relevance determinator 212 component, AI/ML models 214, subject-specific models 216, privacy filters 218, user profiles 220, and a context-sensing hub 222, a raw user prompt 232, a lightweight profile summary model 234, various sensor systems 236, a prompt assistant 242, a user context extractor 242, a privacy enhanced prompt regeneration 246 component, a privacy analyzer and cloud availability 248 determination component, a language context extractor 250, a local LXM 252, a topic model information extractor 254, a knowledge base 256, an on-device adapter 264, a score computation and re-ranking 266 component, a variety of sample outputs 268, and a best output 270, any or all of which may be related to, include, or use lightweight language models and/or middleweight language models. In some embodiments, the Cloud-LXM 203 system may include a generic output sampler 260 that includes a variety of sample outputs 262.

In some embodiments, the user computing device 201 may be configured to receive a raw user prompt 232 in any format (e.g., text, audio, image, etc.), obtain user context information from one or more sources of physical context information and user background information, use the received user prompt 232 and the obtained user context information to generate a contextualized prompt for submission to the Cloud-LXM 203, and output the generated contextualized prompt to the Cloud-LXM 203. In some embodiments, the user computing device 201 may be configured to process context information locally on the user computing device 201 to preserve user privacy.

In some embodiments, the user computing device 201 may be configured to monitor to receive a raw user prompt 232, activate the context-sensing hub 222 to gather sensor data (e.g., acoustic context, user location information, etc.), process the raw sensor data in the context profiler 208 to generate a contextual profile, receive a raw user prompt 232, preprocess the received prompt in a lightweight LLM, analyze the contextual profile in the relevance determinator 212 to identify the relevance of the context information included in the contextual profile, select the most relevant context information, generate a contextualized prompt that augments, appends, prunes or otherwise modifies the received raw user prompt 232 based on the selected context information, send the generated contextualized prompt to Cloud-LXM 203, receive a response from the Cloud-LXM

203, perform on-device post-processing of the received response, present the processed response to the user, capture interaction data (e.g., initial prompt, used context, cloud-based LLM response, etc.), send the captured data to the cloud for model retraining, determine the computational, battery and/or bandwidth resources used for the prompt, update the system settings to optimize resource usage for future prompts, and/or wait for the next user prompt 232.

In some embodiments, in response to the user computing device 201 receiving, capturing, or detecting a raw user prompt 232, the context inference component 206, context profiler 208 component, and context-sensing hub 222 may acquire instantaneous and long-term context information, the relevance determinator 212 may identify the relevant contextual elements in the instantaneous and long-term context information, the contextualized prompt generator 202 and/or the specialized prompt generator 204 may use the identified relevant contextual elements to refine the initial user prompt 232, and the privacy filters 218 may filter out any sensitive or private information from the refined prompts. The user computing device 201 may send the filtered refined contextualized prompt to the Cloud-LXM 203, which may generate a response based on the received prompt.

In some embodiments, the Cloud-LXM 203 may include a generic LLM and operate as the core engine responsible for prompt processing and response generation. The generic LLM component may be a powerful language model that is deployed on the cloud so that it may access and use the robust computational resources of the server computing devices in the cloud. The generic LLM component may be a generalized model that is further enhanced to produce more relevant contextual responses to the contextualized prompts received from the user computing device 201.

The contextualized prompt generator 202 may be configured to generate a contextualized prompt for submission to the Cloud-LXM 203. The contextualized prompt may include context information that may be used by the Cloud-LXM 203 to offer more relevant and complete answers, such as physical context information, user background information, real-time data (e.g., location, current time, activity, etc.) and/or historical profile data (e.g., age, gender, health condition, etc.) determined to be relevant to the user, user prompt 232, or computing device 201. Incorporating such context information into the contextualized prompts may improve the utility and accuracy of the answers generated by the Cloud-LXM 203.

For example, the contextualized prompt generator 202 may be a large language model trained to generate an LXM prompt for the Cloud-LXM 203 (or a selected LXM, etc.) to include information phrased in a manner that will cause the Cloud-LXM 203 (or the selected LXM, etc.) to generate a reply that is responsive to the received user prompt 232 based on knowledge of how the Cloud-LXM 203 (or the selected LXM, etc.) responds to prompt rhetoric. The "prompt rhetoric" may refer to instructions or information that is crafted or selected strategically for an LXM. Generating the LXM prompt for the Cloud-LXM 203 may involve crafting prompts in a way that encourages the LXM to produce desired responses. This may include selecting words, phrasing, and context that align with the LXM's capabilities and knowledge. The prompt rhetoric may guide the AI model towards generating responses that are contextually relevant and/or otherwise allow the LXM to generate more meaningful and accurate information in response to user queries.

In some embodiments, the contextualized prompt generator 202 may be configured to append, augment, prune, and/or refine the user prompt 232 and/or contextual information. For example, the contextualized prompt generator 202 may refine the user prompt 232 by appending to the user prompt 232 the user context information that is relevant to the user prompt 232. As another example, the contextualized prompt generator 202 may refine the user prompt 232 by appending or removing tokens based on their relevance (e.g., as determined by the relevance determinator 212, etc.). For example, if a user profile indicates that the individual is a 25-year-old male taxi driver with a history of heart failure working from 9 pm to 6 am, a prompt such as "Good physical exercise after work?" could be automatically modified by the contextualized prompt generator 202 to "Good physical exercise for young men that is less risky to cause heart attack during daytime?". The contextualized prompt generator 202 may automatically fill in tokens such as 'young', 'men', 'late night shift', and 'chronic heart condition' and omit the 'taxi driver' token for being irrelevant to the prompt.

In some embodiments, the contextualized prompt generator 202 may be configured to generate the contextualized prompt by combining the user prompt 232 and the output of the relevance model. In some embodiments, the contextualized prompt generator 202 may be trained to output a prompt for the LLM that combines relevant user context information with information in the user prompt 232. In some embodiments, the contextualized prompt generator 202 may be configured to generate the contextualized prompt so that it reduces the need for follow-up clarifications and/or reduces the cost of using or interacting with the Cloud-LXM 203.

Specialized prompt generators 204 may include specialized "flavors" of contextualized prompt generators that are configured or trained to serve specific subject matter niches (e.g., fitness, social interactions, medical advice, health advice, career guidance, entertainment suggestions, etc.). That is, the specialized prompt generator 204 may perform the same or similar operations as the contextualized prompt generator 202 but are optimized for particular subject matters.

The context inference component 206 may be configured to transform raw sensory inputs or raw sensor data into actionable context information, which may be activity-based (e.g., walking, running), acoustic (e.g., indoor or outdoor), or related to other sensory data. The context inference component 206 may be configured to determine or infer the immediate context of the user based on sensor data. The determined immediate context may then be used to inform the prompt generation and model responses.

The context profiler component 208 may be configured to use a local lightweight language model that is configured to generate a descriptive summary profile of the user (or a lightweight user profile summary) that summarizes sensor-derived, real-time (e.g., location, current time), historical (e.g., age, gender), and/or long-term (e.g., activities or conditions, etc.) data for a better understanding of the context information. In some embodiments, the local lightweight language model may be a lightweight profile summary model 234 that is trained to receive the obtained user context information and output user context information in a language format. The generated lightweight user profile summary may include demographic details, activity history, long-term behavior patterns (e.g., the time spent at specific locations, etc.), and attributes such as age, gender, occupation, health status, etc. In some embodiments, context profiler component 208 may be configured to store and/or obtain the lightweight user profile summary as summary user context in a user profile summary table in memory that correlates a user profile with categories of instantaneous context and historical context.

The lightweight profile summary model 234 may be a lightweight language model or a specialized machine learning model designed to process and transform raw contextual data into a language or format that can be easily interpreted by other systems, such as LXMs. The "lightweight" characteristic signifies a smaller size and fewer parameters (e.g., hundreds of thousands to tens of millions of parameters, dozens to a few hundred tokens, etc.), enabling faster processing and reduced computational demands. The model's lightweight characteristic also allows for deployment on devices with limited computational resources (e.g., mobile devices, etc.) for localized processing that improves efficiency and user data privacy.

In some embodiments, the lightweight profile summary model 234 may be used to extract deeper contextual understanding from real-time user data collected by the context profiler component 208. For example, a generic user inquiry about nutrition may be converted to a prompt that specifically caters to the unique dietary preferences and conditions of a 30-year-old individual.

In some embodiments, the lightweight profile summary model 234 may convert raw data points (e.g., geolocation, browsing tendencies, etc.) into coherent language-based outputs that are readily understood by an LXM. For example, the lightweight profile summary model 234 may condense user data about location and online interests into a structured sentence, such as "The user, based in the Mountain Time Zone, displays a keen interest in hiking."

The context history tracker 210 component may be configured to track the user's recent activities and choices to determine short-term or instantaneous context information.

The relevance determinator 212 may be configured to use machine learning models to scrutinize user prompts 232, identify contextually relevant tokens (words or phrases) that relate to lightweight user profile summary or user prompt 232, filter out irrelevant information, score or rank the identified tokens based on the degree to which they are relevant (e.g., to the user, to the user prompt 232, to improving response accuracy, etc.), and emphasize the identified contextually relevant tokens that could lead to more accurate or useful LLM responses. In some embodiments, the machine learning models may be trained through supervised, few-shot, or zero-shot approaches. In supervised training, labels are predicted as the output based on a defined dataset. Few-shot training provides a few examples to aid in better label prediction for similar future queries. Zero-shot training utilizes pre-trained models to generalize to unseen categories.

The AI/ML models 214 may include lightweight language models and/or middleweight language models. The AI/ML models 214 may be generalized models that are suitable for use for a wide variety of different tasks.

The subject-specific models 216 may also include lightweight language models and/or middleweight language models. The subject-specific models 216 may be fine-tuned to specific sectors and/or configured to generate more accurate or more relevant outputs for specialized queries.

The privacy filters 218 may be configured to filter out any sensitive information before it leaves the user device (e.g., in prompts or contextual data sent to the Cloud-LXM 203, etc.).

The user profiles 220 may include comprehensive databases that store user-specific information such as user preferences, behavior patterns, and history of interaction with the system.

The context-sensing hub 222 may be configured to use various sensors to collect real-time and historical data, such as location, motion, and audio data. In some embodiments, the context-sensing hub 222 may be configured to receive context information from external sensors that are not on the user computing device 102 but which include high-value information for profile and context generation. In some embodiments, the context-sensing hub 222 may be configured to receive data from multiple devices or a group of peripheral devices that collaboratively compute the context information. In some embodiments, the user's historical data or historical profile may be accessible across multiple devices, allowing for continuous profile updates without rebuilding the profile or context information from scratch.

In some embodiments, the computing device may be configured to share context within a group of users (e.g., family members, etc.) to create more comprehensive profiles, which could be dynamically adjusted based on connectivity, location, and other variables. The groups could be defined, generated, and/or updated dynamically based on connectivity, location, and other variables. The groups could be defined, generated, and/or updated dynamically based on connectivity, location, and other variables.

In some embodiments, the context-sensing hub 222 may be configured to receive data from multiple sensor systems 236, which may include accelerometers, gyroscopes, temperature sensors, light sensors, etc., any or all of which may be used to collect data for generating a more comprehensive contextual profile for the user. The data from the sensors may be real-time (or near real-time) data and/or historical sensed/collected data (e.g., in the running/jogging examples discussed below, information about past runs/jogs may be considered, etc.). In some embodiments, the context-sensing hub 222 may be configured to use sensor fusion algorithms to consolidate varied types of sensory data. The sensor fusion may result in improved accuracy and robustness of the context information. For example, sensor fusion may correlate accelerometer and gyroscope data to determine a user's current activity level precisely, such as distinguishing between walking and jogging. In some embodiments, the context-sensing hub 222 may include or may be configured to work in conjunction with the context history tracker 210 component, which may be configured to track the user's recent activities and choices to determine context information.

The privacy enhanced prompt regeneration 246 component may be configured to revise or rephrase raw user prompts 232 to retain the essence but obscure potentially sensitive data. For example, a user prompt 232 querying about a medical condition may be rephrased to focus on general health questions to reduce the exposure of private health data.

The privacy analyzer and cloud availability 248 determination component may be configured to evaluate various factors such as network latency, cloud server load, and privacy regulations to determine whether to send the prompt and contextual data to Cloud-LXM 203 or handle it locally. As such, the privacy analyzer and cloud availability 248 determination component may assist in balancing tradeoffs between performance, efficiency, and data security.

The language context extractor 250 may be configured to identify idiomatic expressions, jargon, regional dialects, etc. within the user prompt 232 may formulate a more nuanced understanding of the user prompt 232 for fine-tuning the generated responses to be more contextually appropriate for the individual user.

The local LXM 252 may be a lightweight machine learning model that serves as a smaller, more resource-efficient language model that operates directly on the user device to handle simpler queries without the need for cloud resources, thereby improving bandwidth utilization and user privacy.

The topic model information extractor 254 may be configured to categorize user prompts into topics or domains and allow the system to route the query to specialized language models (e.g., subject-specific models 216, etc.) that are fine-tuned in those particular areas for more accurate and relevant responses.

The knowledge base 256 may be a repository of verified information that can be accessed by the Cloud-LXM 203 for generating more reliable and factual responses. This knowledge base might include data sets, academic publications, or other forms of validated information.

The on-device adapter 264 may be configured to translate cloud-based model outputs into formats that are readily understandable and actionable by the user device. For example, the on-device adapter 264 may adapt verbose textual responses into brief messages suitable for smartwatches or generating audible responses for smart speakers.

The score computation and re-ranking 266 component may be configured to evaluate the suitability of various model outputs based on user feedback and other context indicators, which may be used in future interactions to better prioritize model outputs. For example, the score computation and re-ranking 266 component may score, rank, or re-rank tokens based on the degree to which they are relevant (e.g., to the user, to the user prompt, to improving response accuracy, etc.).

The variety of sample outputs 268 may include multiple possible responses that may be further refined or selected based on additional contextual information or user preference. These sample outputs may offer a range of alternatives that may be further fine-tuned to meet specific user needs or preferences. The best output 270 may be determined through a combination of methods, such as user feedback, context relevance, and model confidence scores. This selected output may be presented to the user as the final response.

The generic output sampler 260 may be configured to generate a range of sample outputs 262. The generic output sampler 260 may be configured to facilitate the production and organization of these outputs for further analysis or application. In some embodiments, the generic output sampler 260 may work in conjunction with other modules within the Cloud-LXM 203 system to deliver more comprehensive data sampling. The sample outputs 262 generated by the generic output sampler 260 may be diverse and/or may account for a wide array of possible use-cases or scenarios. These outputs may be numerical, textual, graphical, or a composite of different data types with varying levels of complexity and granularity. In some embodiments, the generic output sampler 260 may be configured to perform batch processing for handling large sets of data or real-time sampling for applications that demand immediate results.

The system 200 may be configured to create more personalized and effective interactions between user devices and cloud-based LXMs by leveraging individual user profiles for prompt optimization. The system 200 may improve query results to include more relevant, personalized, and context-sensitive information, reduce the computational and financial costs involved in interacting with cloud-based LLMs, receive better, more relevant, and more complete answers from the LLM, use on-device LLMs to better protect user privacy, reduce back-and-forth with the cloud model, and bridge the gap between generalized cloud-based language models and individual user needs by intellectively incorporating real-time and historical context into the interaction between the user device and the cloud LLM.

FIGS. 3A-3G are process flow diagrams illustrating methods 300, 310, 320, 330, 340, 350, 360 of generating a contextualized prompt for an LXM in accordance with some embodiments. With reference to FIGS. 1-3G, the methods 300, 310, 320, 330, 340, 350, 360 may be performed in a computing device by at least one processor encompassing one or more processors (e.g., 110, 112, 114, 116, 118, 121, 122, 121, 122, 152, 160, etc.), components or subsystems discussed in this application. Means for performing the functions of the operations in the methods 300, 310, 320, 330, 340, 350, 360 may include at least one processor including one or more of processors 110, 112, 114, 116, 118, 121, 122, 121, 122, 152, 160, and other components described herein. Further, one or more processors of at least one processor may be configured with software or firmware to perform some or all of the operations of the methods 300, 310, 320, 330, 340, 350, 360. In order to encompass the alternative configurations enabled in various embodiments, the hardware implementing any or all of the methods 300, 310, 320, 330, 340, 350, 360 is referred to herein as a "at least one processor."

For the sake of clarity and ease of presentation, the methods 300, 310, 320, 330, 340, 350, 360 are presented as separate embodiments. While each method is delineated for illustrative purposes, it should be clear to those skilled in the art that various combinations or omissions of these methods, blocks, operations, etc. could be used to achieve a desired result or a specific outcome. It should also be understood that the descriptions herein do not preclude the integration or adaptation of different embodiments of the methods, blocks, operations, etc. to produce a modified or alternative result or solution. The presentation of individual methods, blocks, operations, etc. should not be interpreted as mutually exclusive, limiting, or as being required unless expressly recited as such in the claims.

For the sake of clarity and ease of presentation, specific components described with reference to FIGS. 2A-2F are identified as performing specific operations of methods 300, 310, 320, 330, 340, 350, 360. However, it should be understood that in the various embodiments, the operations in block 300, 310, 320, 330, 340, 350, 360 may be performed by any or all of the components illustrated and described with reference to FIGS. 2A-2F or described anywhere in this application.

With reference to FIGS. 1-3A, in block 302, the at least one processor may receive a user prompt (e.g., user prompt 232, etc.) for an LXM. For example, in a smart home device equipped with a voice assistant, the at least one processor may receive voice prompts after they have been converted into text. In some embodiments, the operations in block 302 may be performed via the contextualized prompt generator 202 of the user computing device 201 illustrated and described with reference to FIGS. 2A-2F.

In block 304, the at least one processor may obtain user context information from one or more sources of physical context information and user background information. For example, the at least one processor may access and use data from any of a variety of sensors (e.g., Global Positioning System (GPS) receivers, accelerometers, thermometers, etc.) to infer the user's current physical context. The at least one processor may obtain user background information from databases or other storage media, such as from a user profile stored in memory. In some embodiments, the operations in block 304 may be performed using the context inference component 206 and the context-sensing hub 222 for obtaining user context information illustrated and described with reference to FIGS. 2A-2F.

In blocks 306 and 308, the at least one processor may use the received user prompt and the obtained user context information to generate a contextualized prompt for submission to an LXM, and output the generated contextualized prompt to the LXM. For example, the at least one processor may generate the contextualized prompt by merging the original user prompt with additional context data. Such contextualized prompts may increase the accuracy of the LXM's responses by enabling the model to generate replies that are both relevant and specific to the query at hand. In addition, the added context may enhance the efficiency of the interaction by reducing the likelihood of requiring additional user inputs, clarifications, or follow-up interactions. This may in turn lead to a more streamlined experience and reduce costs associated with using a third-party LXM. The added context information may also allow for greater personalization in the system's responses. The LXM may adapt its output to align more closely with the individual characteristics or preferences of the user, thereby increasing the overall quality of the interaction. In some embodiments, the operations in block 306 may be performed using the specialized prompt generators 204 and the context profiler 208 illustrated and described with reference to FIGS. 2A-2F. In some embodiments, the operations in block 308 may be performed using the AI/ML models 214 or subject-specific models 216 illustrated and described with reference to FIGS. 2A-2F.

Figure 3A:
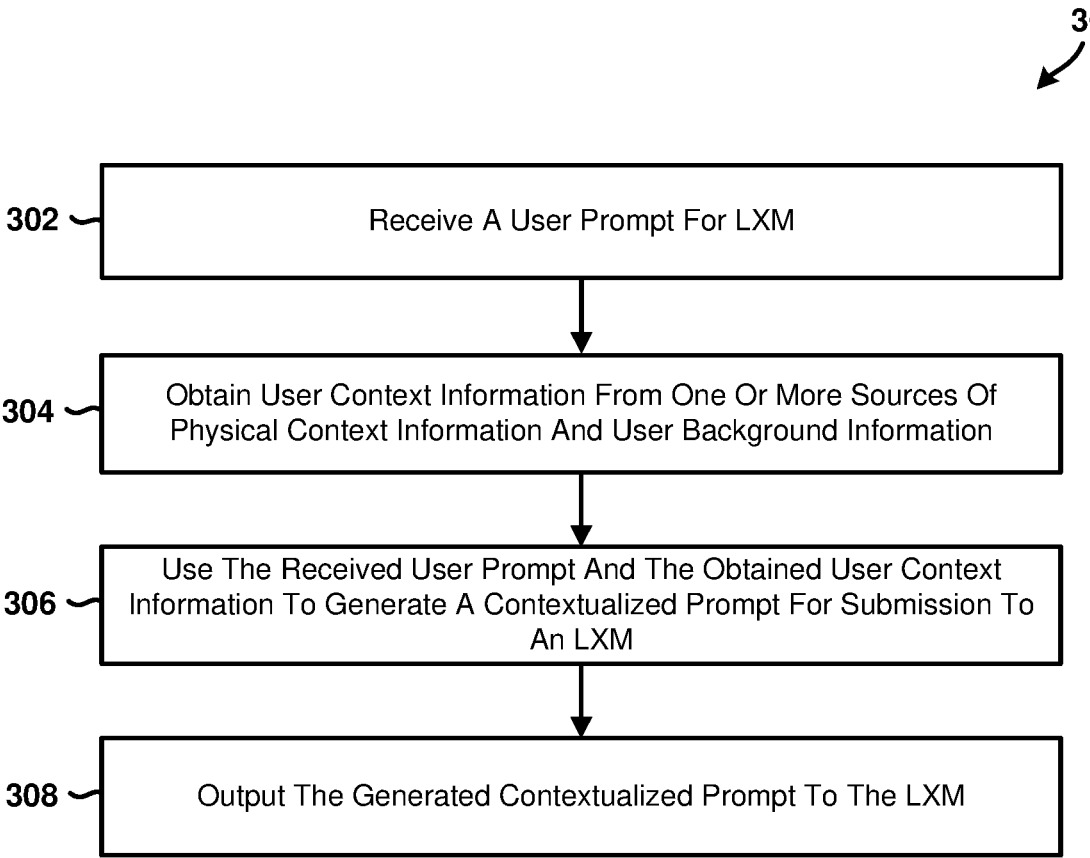

With reference to FIGS. 1-3B, in blocks 302 and 304 the at least one processor may perform the operations discussed above with reference to blocks 302 and 304 in FIG. 3A.

In block 312, the at least one processor may process the obtained user context information in a lightweight profile summary model that is trained to receive the obtained user context information and output user context information in a language format. Said another way, the at least one processor may use a lightweight profile summary model to process obtained user context information and transform diverse sets of context information into a standardized language format that the LXM can efficiently interpret. For example, the user context information may include geolocation data, the current time, and a browsing history containing recent searches for "best hiking trails" This raw context information, while valuable, may not be immediately usable by the LXM in its original format. The lightweight profile summary model may be trained to convert such data into language-based output. For example, the lightweight profile summary model may transform the variables into a contextual string such as "User is located in Mountain Time Zone, browsing history indicates interest in hiking, and it is currently daytime." In some embodiments, the operations in block 312 may be performed using the lightweight profile summary model 234 illustrated and described with reference to FIGS. 2A-2F.

In block 314, the at least one processor may generate a contextualized prompt for submission to an LXM based on the received user prompt, the obtained user context information, the output user context information, or any combination thereof. For example, the at least one processor may gather user context information such as the user's age, dietary restrictions, and recent online searches related to vegan diets in response to determining that the user prompt is "Tell me about nutrition." The lightweight profile summary model may process this data to output language-formatted context information such as "User is 30 years old, searches indicate an interest in vegan diets, and has a lactose intolerance." The at least one processor may combine these elements to generate a contextualized prompt such as "Tell me about nutrition that is relevant to a 30-year-old interested in vegan diets and who is lactose intolerant." This in turn may allow the LXM to provide a more nuanced response that caters to the specific dietary interests and needs of the user, as opposed to offering general information about nutrition that might not be as relevant. In some embodiments, the operations in block 314 may be performed using relevance determinator 212 and the context history tracker 210 illustrated and described with reference to FIGS. 2A-2F.

In block 308 the at least one processor may perform the operations discussed above with reference to block 308 in FIG. 3A.

With reference to FIGS. 1-3C, in blocks 302 and 304 the at least one processor may perform the operations discussed above with reference to blocks 302 and 304 in FIG. 3A.

In block 322, the at least one processor may process the user input prompt and the user context information in a relevance model that is trained to receive as inputs the user prompt and the user context information and output elements of the user context information that are relevant to the user prompt. That is, the at least one processor may use a relevance model to process both the received user prompt and the user context information. The relevance model may be trained to identify the elements in the context information that are relevant to the user prompt and/or that may result in a more relevant, contextualized and/or accurate answer from the LXM. In some embodiments, the operations in block 322 may be performed using the topic model information extractor 254 to select a relevance model based on the subject matter in the received user prompt 232 illustrated and described with reference to FIGS. 2A-2F.

In block 324, the at least one processor may combine the user prompt and the output of the relevance model in a contextualized prompt generator that is trained to output a prompt for the LXM that combines relevant user context information with information in the user prompt. For example, the at least one processor may evaluate context information that indicates the user is 30-year-old fan of science fiction and has recently searched for books by Author A in response to determining that the user prompt is "What's a good book to read?." The at least one processor may apply this information to a relevance model that generates output that indicates that the user's interest in science fiction and recent search history are elements that are relevant to the book recommendation query. The contextualized prompt generator may combine the original prompt with these identified elements to generate the contextualized prompt "What's a good science fiction book to read for someone who likes Author A?" In some embodiments, the operations in block 324 may be performed using the contextualized prompt generator 202 and the selected relevance model illustrated and described with reference to FIGS. 2A-2F.

In block 308 the at least one processor may perform the operations discussed above with reference to block 308 in FIG. 3A.

With reference to FIGS. 1-3D, in blocks 302 and 304 the at least one processor may perform the operations discussed above with reference to blocks 302 and 304 in FIG. 3A.

In block 332, the at least one processor may select a relevance model (e.g., a correlation relevance model) from among a plurality of relevance models based on a subject matter in the received user prompt. That is, the at least one processor may choose a specific model based on the subject matter of the received user prompt to increase the accuracy and relevance of the contextual information that will be integrated into the contextualized prompt. For example, the at least one processor may identify the subject matter as being healthcare-related in a system with relevance models trained in the areas of healthcare, technology, and literature, and a user prompt asking "What are the benefits of a ketogenic diet?" The healthcare-specific relevance model may be trained to place higher weight on user context elements such as age, pre-existing medical conditions, or previous search history related to diets or healthcare. After processing the context information through this model, the resulting filtered or weighted context details may be combined with the original user prompt to generate a contextualized prompt that asks, for example, "What are the benefits of a ketogenic diet for a 40-year-old with diabetes?". In some embodiments, the operations in block 332 may be performed using the score computation and re-ranking 266 component illustrated and described with reference to FIGS. 2A-2F.

In block 334, the at least one processor may process the user input prompt and the user context information in the selected relevance model. In some embodiments, the selected relevance model may be correlation relevance model. In some embodiments, the selected relevance model may be trained to receive as inputs the user prompt and the user context information and output elements of the user context information that are relevant to the user prompt. The correlation relevance model may be a specialized model that is particularly apt at identifying contextual elements that have a greater correlation or relevance to the user query, and thus may better identify and quantify the relationship between different pieces of context information and the user prompt. The output from the correlation relevance model may serve as a refined set of context data that may be used to create a contextualized prompt. For example, a correlation relevance model trained in financial matters may analyze a user prompt that asks "What are some good investment strategies?" and context information that includes the user's age, occupation, financial literacy level, and recent transactions to determine that the user's age and financial literacy level are highly correlated to the type of investment strategies that may be suitable for them. The correlation relevance model may disregard occupation and recent transactions as less relevant in this particular case. In this example, the contextualized prompt may be, for example, "What are some good investment strategies for a 35-year-old with an advanced understanding of finance?" In some embodiments, the operations in block 334 may be performed using the user prompt 232, user context information, relevance determinator 212 component, the selected relevance model, and/or AI/ML models 214 illustrated and described with reference to FIGS. 2A-2F.

In block 336, the at least one processor may combine the user prompt and the output of the selected relevance model in a contextualized prompt generator that is trained to output a prompt for the LXM that combines relevant user context information with information in the user prompt. The inclusion of the output from the selected relevance model may allow the at least one processor to refine the user prompt with context information that has been identified as being relevant to the user prompt. This additional context information may be incorporated into the original user prompt to enhance the specificity and relevance of the query sent to the LXM. In some embodiments, the operations in block 336 may be performed using contextualized prompt generator 202 illustrated and described with reference to FIGS. 2A-2F.

In block 308 the at least one processor may perform the operations discussed above with reference to block 308 in FIG. 3A.

With reference to FIGS. 1-3E, in blocks 302 and 304 the at least one processor may perform the operations discussed above with reference to blocks 302 and 304 in FIG. 3A.

Figure 3C:
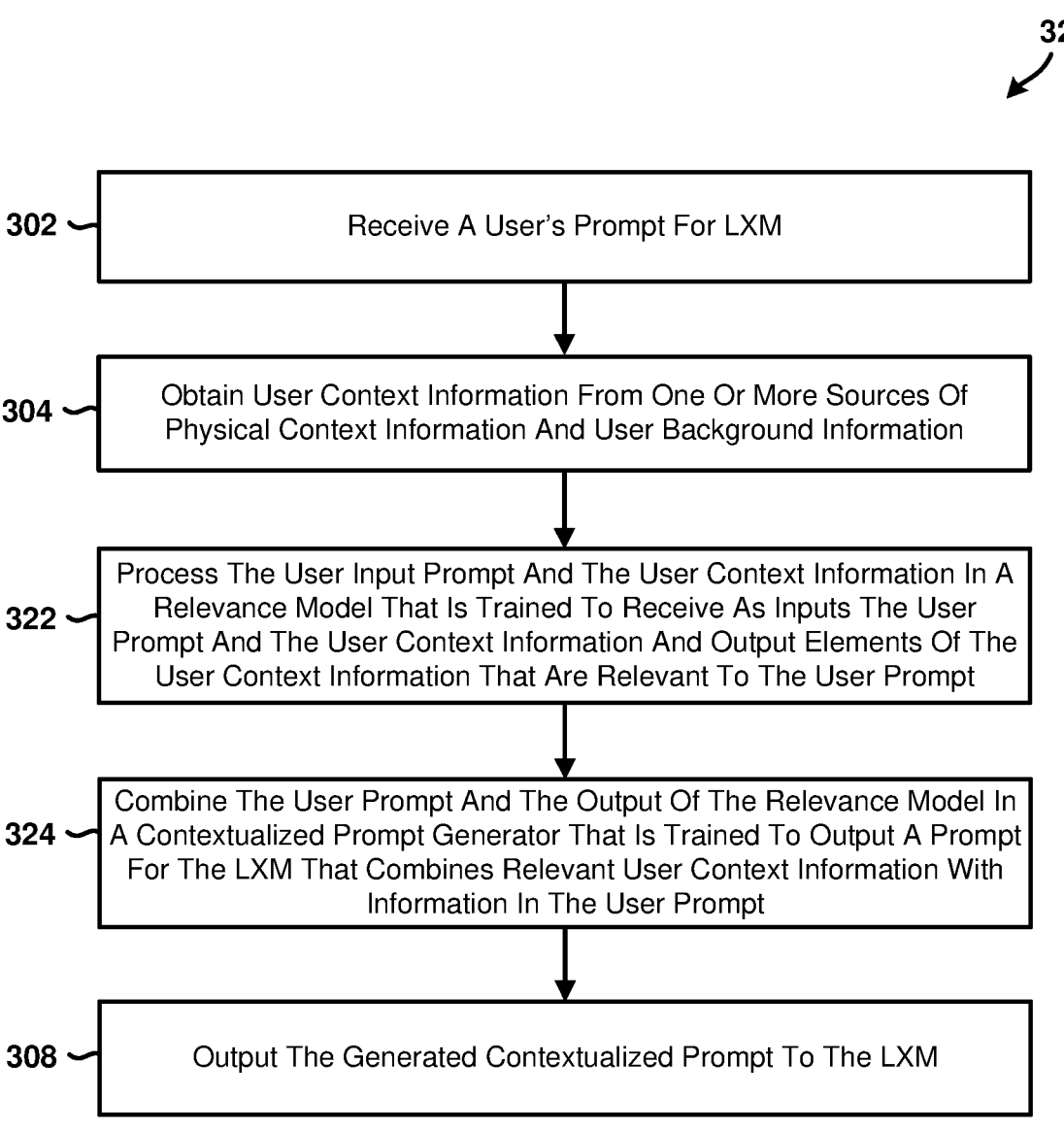

In blocks 322 and 324 the at least one processor may perform the operations discussed above with reference to blocks 322 and 324 in FIG. 3C.

In blocks 342 and 344, the at least one processor may select an LXM from a plurality of available LXM models based on the physical context of the user in the user context information and output the generated contextualized prompt to the selected LXM. For example, the at least one processor may select an LXM based on various factors in the user context information, including as the physical context of the user. The at least one processor may correlate the physical context with the capabilities and specialties of the available LXMs to improve the LXM output. In some embodiments, the operations in blocks 342 and 344 may be performed using sample outputs 268 to select an LXM and output the generated contextualized prompt illustrated and described with reference to FIGS. 2A-2F.

With reference to FIGS. 1-3F, in block 302 the at least one processor may perform the operations discussed above with reference to block 302 in FIG. 3A.

In block 352, the at least one processor may process the received user prompt by a language model that is trained to identify a category of subject matter in the received user prompt. For example, the at least one processor may prompt a specialized language model that is trained to categorize the subject matter of a received user prompt. This categorization may serve several purposes, such as routing the query to the most suitable LXM or tailoring the subsequent interaction based on the identified category. For example, the at least one processor may use the trained language model to identify the category of a user prompt as "Science & Technology" in response to receiving a user prompt asking "Tell me about the recent advancements in renewable energy." In response, the at least one processor may selection use an LXM specializes in scientific subjects or technological advancements. In some embodiments, the operations in block 352 may be performed using knowledge base 256 and the language context extractor 250 illustrated and described with reference to FIGS. 2A-2F.

In blocks 304 and 306 the at least one processor may perform the operations discussed above with reference to blocks 304 and 306 in FIG. 3A.

In block 354, the at least one processor may use the identified subject matter category to select an LXM from a plurality of available LXM models to which the prompt will be applied. For example, the at least one processor may select and use an LXM trained on culinary information in response to categorizing a user prompt that asks "How can I cook a turkey?" under "Cooking" or "Food Preparation." In some embodiments, the operations in block 354 may be performed using local LXM 252 for selecting an LXM based on identified subject matter as illustrated and described with reference to FIGS. 2A-2F.

In block 344, the at least one processor may perform the operations discussed above with reference to block 344 in FIG. 3E.

With reference to FIGS. 1-3G, in block 302 the at least one processor may perform the operations discussed above with reference to block 302 in FIG. 3A.

In block 362, the at least one processor may obtain local context information from a data source available on a locally available database (e.g., a local context database). The locally available database may be a specialized data repository stored on the user's device or in a localized network. This database may contain context information that is private or specific to the user, such as local files, browsing history, or sensor data. In addition, locally available database may store a large variety of context information, ranging from user preferences and historical data to sensor-based readings such temperature, location, or motion status. Accessing this local database may allow the at least one processor to integrate these pieces of information into its determinations without the latency or potential privacy risks associated with cloud-based data retrieval. In some embodiments, the operations in block 362 may be performed using on-device adapter 264 illustrated and described with reference to FIGS. 2A-2F.

In block 304 the at least one processor may perform the operations discussed above with reference to block 304 in FIG. 3A.

In block 364, the at least one processor may use the obtained local context information in conjunction with the received user prompt and the obtained user context information to generate the contextualized prompt for submission to an LXM. For example, the at least one processor may generate a contextualized prompt asking "Should I go for a run today, considering my current heart rate of 75 bpm and having run three times already this week?" in response to an otherwise seemingly straightforward user prompt that asks "Should I go for a run today?" in response to evaluating heart rate and other local context information (e.g., historical exercise patterns, etc.). In some embodiments, the operations in block 364 may be performed using user context extractor 242 in conjunction with obtained local context information as illustrated and described with reference to FIGS. 2A-2F.

In block 344, the at least one processor may perform the operations discussed above with reference to block 344 in FIG. 3E.

FIGS. 4A-4E are process flow diagrams illustrating methods 400, 410, 420, 430, 440 in accordance with some embodiments. With reference to FIGS. 1-4E, the methods 400, 410, 420, 430, 440 may be performed in a computing device by at least one processor encompassing one or more processors (e.g., 110, 112, 114, 116, 118, 121, 122, 121, 122, 152, 160, etc.), components or subsystems discussed in this application. Means for performing the functions of the operations in the methods 400, 410, 420, 430, 440 may include at least one processor including one or more of processors 110, 112, 114, 116, 118, 121, 122, 121, 122, 152, 160, and other components described herein. Further, one or more processors of at least one processor may be configured with software or firmware to perform some or all of the operations of the methods 400, 410, 420, 430, 440. In order to encompass the alternative configurations enabled in various embodiments, the hardware implementing any or all of the methods 400, 410, 420, 430, 440 is referred to herein as a "at least one processor."

With reference to FIGS. 1-4A, in blocks 402 and 404, the at least one processor may receive a prompt for the LXM from a user (user prompt) and process the prompt to determine whether the prompt includes privacy information or causes an LXM to provide a response that will reveal privacy information. In some embodiments, the at least one processor may process the prompt in a trained model that has been trained to recognize privacy information. For example, a user prompt that asks "What are the symptoms of [a specific medical condition]?" may not contain highly sensitive information in itself. However, the at least one processor may recognize that the user is asking from a device that is shared or within a non-private location and generating a specific response could risk revealing privacy-sensitive information to others nearby. In response, the at least one processor may implement additional measures to ensure that the response from the LXM does not compromise the user's privacy. In some embodiments, the operations in blocks 402 and 404 may be performed using privacy filters 218 and the privacy analyzer and cloud availability 248 component as illustrated and described with reference to FIGS. 2A-2F.

In block 406, the at least one processor may use the LXM to provide a response to the prompt from the user (user prompt) in a manner that will avoid disclosure of privacy information. In some embodiments, using the LXM in block 406 may include selecting a locally hosted LXM in response to recognizing that the prompt from the user includes privacy information. In some embodiments, using the LXM in block 406 may include generating a privacy-enhanced prompt that will cause the LXM to respond to the prompt from the user without revealing privacy information, and submitting the privacy-enhanced prompt to the LXM. In some embodiments, the operations in block 406 may be performed using privacy-enhanced prompt regeneration 246 component illustrated and described with reference to FIGS. 2A-2F.

In some embodiments, using the LXM in block 406 may include determining whether the user is in a non-private location, generating a privacy-enhanced prompt that is phrased to cause the LXM to respond to the prompt from the user without revealing privacy information, and submitting the privacy-enhanced prompt to the LXM. In some embodiments, using the LXM in block 406 may include presenting the user prompt to the LXM multiple times and receiving multiple different responses from the LXM, obtaining user context information from a source of physical context information and user background information, evaluating the multiple different responses received from the LXM based on the obtained user context information and the user prompt to identify one of the responses that is best responds to the user prompt, and presenting the identified one of the responses to the user.

Figure 4A:
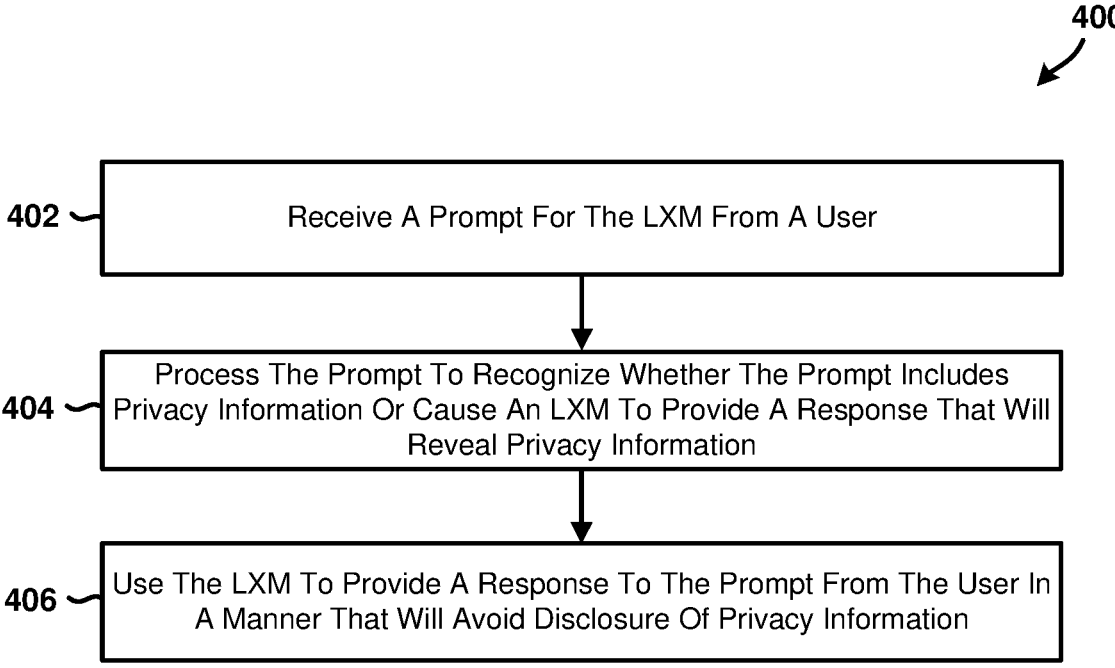
Figure 4C:
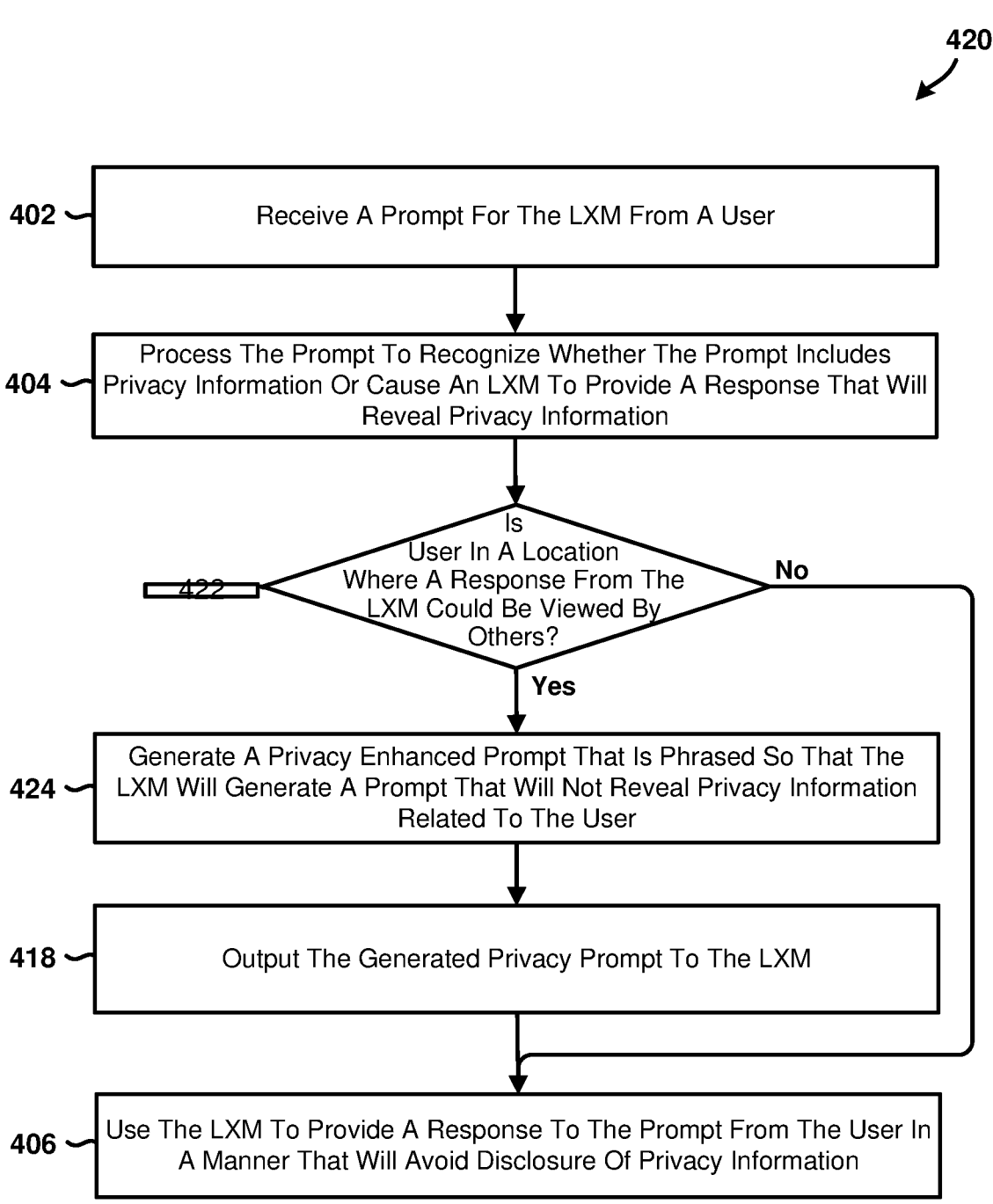
Figure 4D:
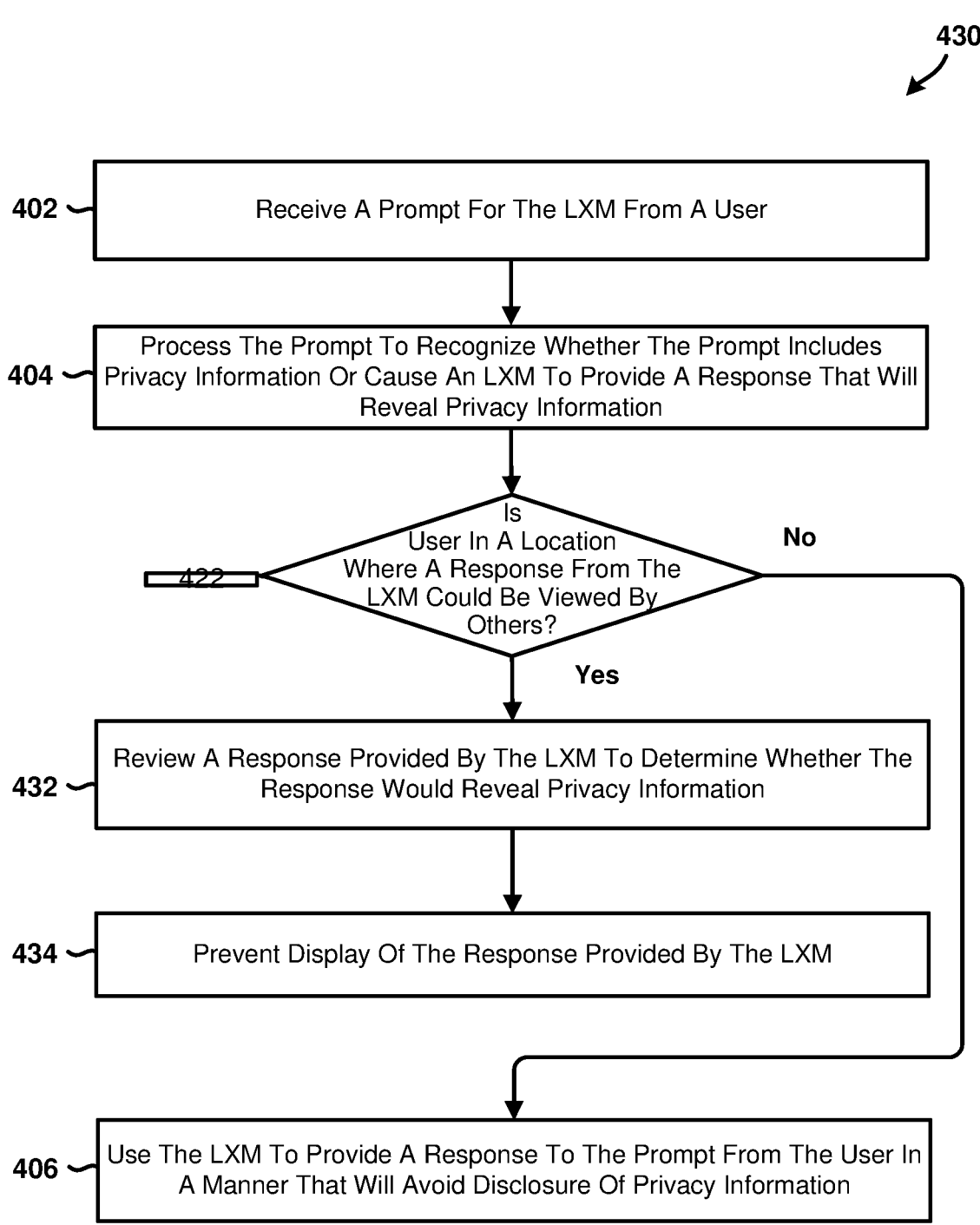

With reference to FIGS. 1-4B, in blocks 402 and 404 the at least one processor may perform the operations discussed above with reference to blocks 402 and 404 in FIG. 4A.

In block 412, the at least one processor may obtain user context information from a source of physical context information and user background information. The physical context information may include data points such as location, time, ambient conditions, heart rate, activity level, sleep patterns, etc. The user background information may include user preferences, demographic data, user's medical history, health goals, past behaviors (e.g., user frequently engages with sports-related content on a news app, etc.). In some embodiments, the operations in block 412 may be performed using the context-sensing hub 222 illustrated and described with reference to FIGS. 2A-2F.

In block 414, the at least one processor may process the user context information to detect information that could pose a privacy risk. Said another way, the at least one processor may identify elements within the user context information that could pose a privacy risk to the user or violate data protection regulations. In some embodiments, the at least one processor may be configured to use machine learning models that are trained to flag sensitive or personally identifiable information. For example, the at least one processor may use the trained machine learning model to scan through the information and flag health data collected from a health app that identifies a specific medical condition of the user as sensitive data that should not be stored or used inappropriately. Similarly, the at least one processor could flag account numbers, Social Security numbers, and other similar information as sensitive. In some embodiments, the operations in block 412 may be performed using the privacy analyzer and cloud availability 248 illustrated and described with reference to FIGS. 2A-2F.

In block 416 and 418, the at least one processor may generate a privacy-enhanced prompt using the prompt from the user and the obtained user context information to generate a contextualized prompt for submission to the LXM that does not reveal privacy information and output the generated privacy prompt to the LXM. In some embodiments, the at least one processor may selectively incorporate elements from the original user prompt and the user context information to generate a privacy-enhanced prompt that serves the intended purpose without compromising user privacy.

In block 406, the at least one processor may perform the operations discussed above with reference to block 406 in FIG. 4A.

With reference to FIGS. 1-4C, in blocks 402 and 404 the at least one processor may perform the operations discussed above with reference to blocks 402 and 404 in FIG. 4A.

In determination block 422, the at least one processor may determine whether the user is in a location where others could view or hear a response from the LXM. For example, the at least one processor may use the microphone and cameras, etc. to assess the presence of additional people in the vicinity. For example, the at least one processor may determine that the user is in a location where others could view a response from the LXM in response to the microphone detects multiple voices or the camera recognizing more than one face. As another example, the at least one processor may use Bluetooth or Wi-Fi data to determine whether the device is connected to a public Wi-Fi network or detects multiple Bluetooth devices in close physical proximity the user device, which are indicators of a less private environment. In some embodiments, the at least one processor may user machine learning algorithms to analyze a combination of these factors an make a more accurate assessment.

In response to determining that the user is in a location where a response from the LXM could be viewed or heard by others (i.e., determination block 422="Yes"), the at least one processor may generate a privacy-enhanced prompt that is phrased so that the LXM will generate a prompt that will not reveal privacy information related to the user in block 424. For example, the at least one processor may use semantic manipulation and/or pre-established privacy protocols to rephrase or reframe the original user prompt in response to determining that the user is in a setting where the LXM's response could be viewed or heard by others. The semantic manipulation operations may maintain the essence of the original user prompt without using explicit terms that could lead to the exposure of private or sensitive user information. For example, the at least one processor may generate the privacy-enhanced prompt to ask "securely show me non-confidential details of my bank account," in response to receiving a user prompt that asks "Tell me everything about my bank account" and determining that the user in a public place or in a location where a response from the LXM could be viewed or heard by others. In response, the LXM might then provide a coded or generalized answer and/or otherwise ensure that confidential data remains protected when the user is in a public or semi-public location.

In block 418 the at least one processor may perform the operations discussed above with reference to block 418 in FIG. 4B.

In response to determining that the user is not in a location where a response from the LXM could be viewed by others (i.e., determination block 422="No"), the at least one processor may perform the operations discussed above with reference to block 406 in FIG. 4A.

With reference to FIGS. 1-4D, in blocks 402 and 404 the at least one processor may perform the operations discussed above with reference to blocks 402 and 404 in FIG. 4A.

In determination block 422, the at least one processor may perform the operations discussed above with reference to block 422 in FIG. 4C.

In response to determining that the user is in a location where a response from the LXM could be viewed by others (i.e., determination block 422= "Yes"), the at least one processor may review a response provided by the LXM to determine whether the response would reveal privacy information in block 432 and prevent display (or presenting, playing, rendering, providing, etc.) of the response provided by the LXM in block 434 in response to determining that the response would reveal privacy information.

Thus, the at least one processor may be configured to scrutinize the responses generated by the LXM before they are displayed (or presented, played, etc.) to the user to reduce or mitigate the risk of divulging sensitive or private information. For example, if a user were to query the LXM about their recent medical history, the LXM may generate a response containing detailed health records. Before displaying (or presenting, playing, etc.) this information, the at least one processor could scan the generated text for specific medical terms or data points that are typically considered private. If such terms are found, the system may withhold the LXM's response and instead present a message such as, "The requested information is sensitive. Please verify your identity to access these details."

In response to determining that the user is not in a location where a response from the LXM could be viewed by others (i.e., determination block 422="No"), the at least one processor may perform the operations discussed above with reference to block 406 in FIG. 4A.

With reference to FIGS. 1-4E, in blocks 402, 404 and 406 the at least one processor may perform the operations discussed above with reference to blocks 402, 404 and 406 in FIG. 4A.

In block 442 the at least one processor may notify the user that the response provided by the LXM is not being displayed to prevent disclosure of privacy information. In some embodiments, the at least one processor may obtain local context information from a data source available on a local context database and use the obtained local context information in conjunction with the received user prompt to provide a response to the user prompt in the manner that will avoid the disclosure of the privacy information.

Figure 5:
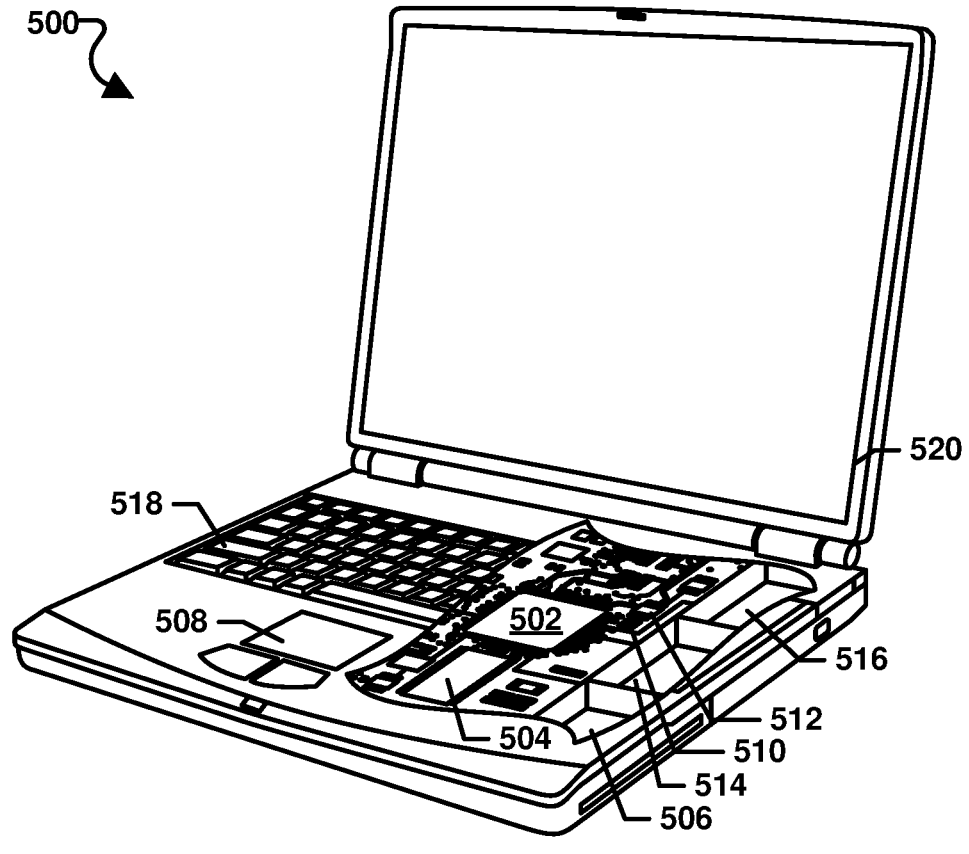
FIG. 5 is a component block diagram illustrating an example computing device in the form of a laptop that is suitable for implementing some embodiments.

Various embodiments (including, but not limited to, embodiments described above with reference to FIGS. 1-4) may be implemented in a wide variety of wireless devices and computing systems including a laptop computer 500, an example of which is illustrated in FIG. 5. With reference to FIGS. 1-5, a laptop computer may include a processor 502 coupled to volatile memory 504 and a large capacity non-volatile memory, such as a disk drive 506 of Flash memory. The laptop computer 500 may include a touchpad touch surface 508 that serves as the computer's pointing device, and thus may receive drag, scroll, and flick gestures. Additionally, the laptop computer 500 may have one or more antenna 510 for sending and receiving electromagnetic radiation that may be connected to a wireless data link and/or cellular telephone transceiver 512 coupled to the processor 502. The computer 500 may also include a BT transceiver 514, a compact disc (CD) drive 516, a keyboard 518, and a display 520 all coupled to the processor 502. Other configurations of the computing device may include a computer mouse or trackball coupled to the processor (e.g., via a universal serial bus (USB) input) as are well known, which may also be used in conjunction with various embodiments.

Figure 6:
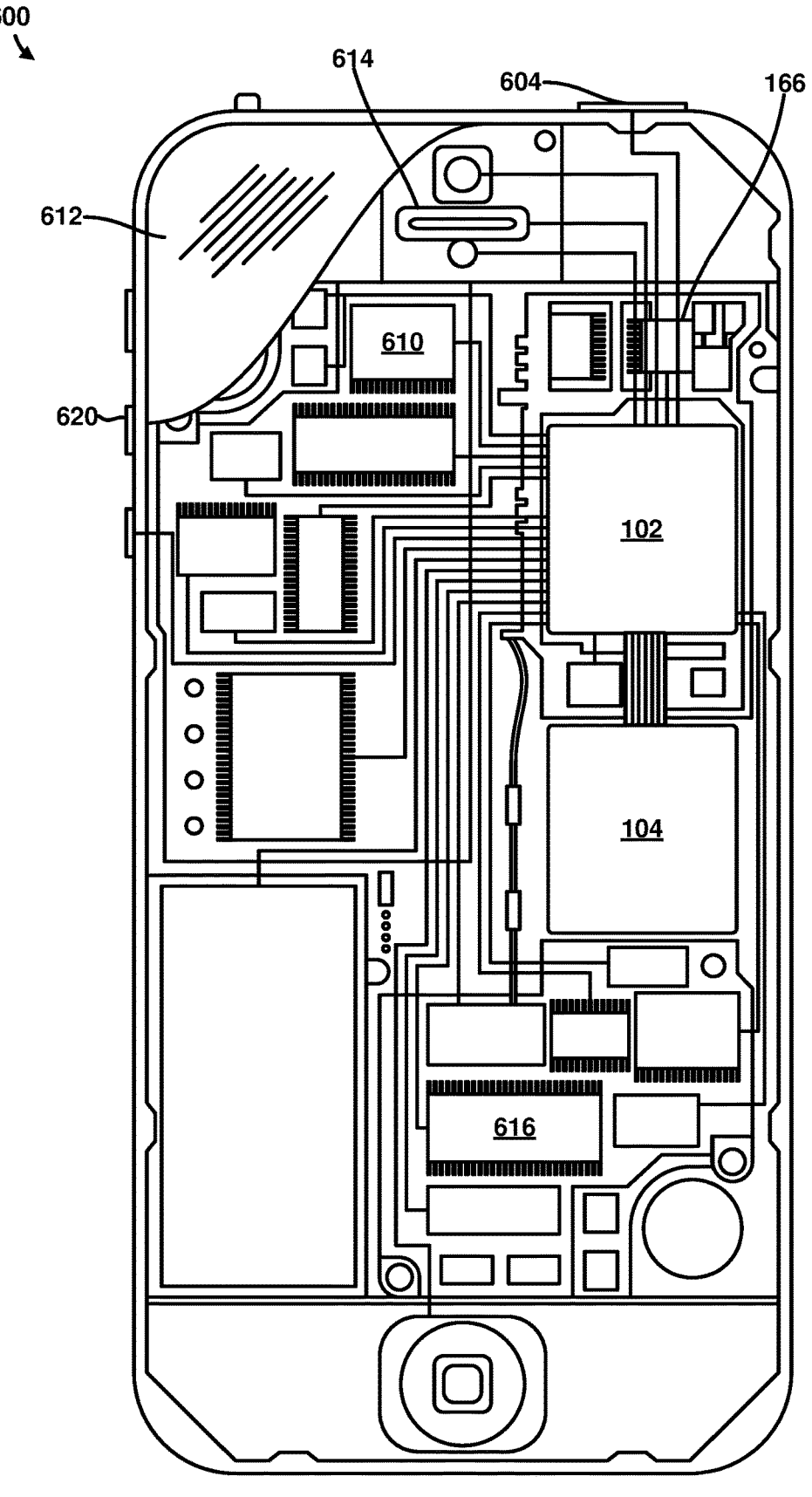
FIG. 6 is a component block diagram illustrating an example wireless communication device suitable for use with various embodiments.

FIG. 6 is a component block diagram of a computing device 600 suitable for use with various embodiments. With reference to FIGS. 1-6, various embodiments may be implemented on a variety of computing devices 600, an example of which is illustrated in FIG. 6 in the form of a smartphone. The computing device 600 may include a first SOC 102 coupled to a second SOC 104. The first and second SoCs 102, 104 may be coupled to internal memory 616, a display 612, and to a speaker 614. The first and second SOCs 102, 104 may also be coupled to at least one subscriber identity module (SIM) 640 and/or a SIM interface that may store information supporting a first 5GNR subscription and a second 5GNR subscription, which support service on a 5G non-standalone (NSA) network.

The computing device 600 may include an antenna 604 for sending and receiving electromagnetic radiation that may be connected to a wireless transceiver 166 coupled to one or more processors in the first and/or second SOCs 102, 104. The computing device 600 may also include menu selection buttons or rocker switches 620 for receiving user inputs.

The computing device 600 also includes a sound encoding/decoding (CODEC) circuit 610, which digitizes sound received from a microphone into data packets suitable for wireless transmission and decodes received sound data packets to generate analog signals that are provided to the speaker to generate sound. Also, one or more of the processors in the first and second circuitries 102, 104, wireless transceiver 166 and CODEC 610 may include a digital signal processor (DSP) circuit (not shown separately).

Figure 7:
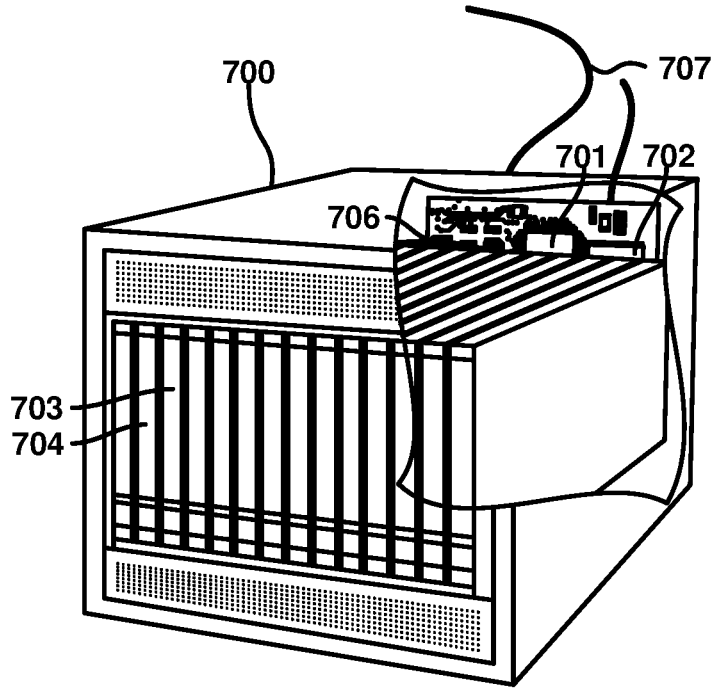
FIG. 7 is a component diagram of an example server suitable for implementing some embodiments.

Some embodiments may be implemented on any of a variety of commercially available computing devices, such as the server computing device 700 illustrated in FIG. 7. Such a server device 700 may include a processor 701 coupled to volatile memory 702 and a large capacity non-volatile memory, such as a disk drive 703. The server device 700 may also include a floppy disc drive, USB, etc. coupled to the processor 701. The server device 700 may also include network access ports 706 coupled to the processor 701 for establishing data connections with a network connection circuit 704 and a communication network 707 (e.g., an Internet protocol (IP) network) coupled to other communication system network elements.

The processors or processing units discussed in this application may be any programmable microprocessor, microcomputer, or multiple processor chip or chips that can be configured by software instructions (applications) to perform a variety of functions, including the functions of various embodiments described. In some computing devices, multiple processors may be provided, such as one processor within first circuitry dedicated to wireless communication functions and one processor within a second circuitry dedicated to running other applications. Software applications may be stored in the memory before they are accessed and loaded into the processor. The processors may include internal memory sufficient to store the application software instructions.

Implementation examples are described in the following paragraphs. While some of the following implementation examples are described in terms of example methods, further example implementations may include: the example methods discussed in the following paragraphs implemented by a computing device including at least one processor coupled to memory and configured (e.g., with processor-executable instructions) to perform operations of the methods of the following implementation examples; the example methods discussed in the following paragraphs implemented by a computing device including means for performing functions of the methods of the following implementation examples; and the example methods discussed in the following paragraphs may be implemented as a non-transitory processor-readable storage medium having stored thereon processor-executable instructions configured to cause a processor of a computing device to perform the operations of the methods of the following implementation examples.

Example 1: A method of generating a prompt for a large generative artificial intelligence model (LXM), including receiving a user prompt from a user, processing the user prompt to recognize whether the user prompt includes privacy information or will cause the LXM to provide a response that will reveal the privacy information, and utilizing the LXM to provide a response to the user prompt in a manner that will avoid disclosure of the privacy information.

Example 2: The method of example 1, in which processing the user prompt to recognize whether the prompt includes the privacy information or will cause the LXM to provide the response that will reveal the privacy information includes processing the user prompt in a trained model that has been trained to recognize the privacy information.

Example 3: The method of example 2, in which utilizing the LXM to provide the response to the user prompt in the manner that will avoid the disclosure of the privacy information includes selecting a locally-hosted LXM in response to recognizing that the user prompt includes the privacy information.

Example 4: The method of any of the examples 1-3, in which utilizing the LXM to provide the response to the user prompt in the manner that will avoid the disclosure of the privacy information includes generating a privacy enhanced prompt that will cause the LXM to respond without revealing the privacy information, and submitting the privacy enhanced prompt to the LXM.

Example 5: The method of any of the examples 1-4, in which utilizing the LXM to provide the response to the user prompt in the manner that will avoid the disclosure of the privacy information includes determining whether the user is in a non-private location, generating a privacy enhanced prompt that is phrased to cause the LXM to respond without revealing the privacy information, and submitting the privacy enhanced prompt to the LXM.

Example 6: The method of any of the examples 1-5, further including obtaining user context information from a source of physical context information and user background information; and processing the user context information to detect information that could pose a privacy risk, in which utilizing the LXM to provide the response to the user prompt in the manner that will avoid the disclosure of the privacy information includes generating a privacy enhanced prompt using the user prompt and the user context information to generate a contextualized prompt for submission to the LXM that does not reveal the privacy information, and outputting the privacy enhanced prompt to the LXM.

Example 7: The method of any of the examples 1-6, further including determining whether the user is in a location where the response to the user prompt from the LXM could be viewed by others, in which utilizing the LXM to provide the response to the user prompt in the manner that will avoid the disclosure of the privacy information includes generating a privacy enhanced prompt that is phrased so that the LXM will generate the prompt that will not reveal the privacy information related to the user in response to determining that the user is in the location where the response to the user prompt from the LXM could be viewed by others, and outputting the privacy enhanced prompt to the LXM.

Example 8: The method of any of the examples 1-7, further including determining whether the user is in a location where the response to the user prompt from the LXM could be viewed by others, in which utilizing the LXM to provide the response to the user prompt in the manner that will avoid the disclosure of the privacy information includes reviewing the response to the user prompt provided by the LXM to determine whether the response to the user prompt would reveal the privacy information in response to determining that the user is in the location where the response to the user prompt from the LXM could be viewed by others, and preventing presentation of the response to the user prompt provided by the LXM.

Example 9: The method of example 8, further including notifying the user that the response to the user prompt provided by the LXM is not being presented to prevent the disclosure of the privacy information.

Example 10: The method of any of the examples 1-9, in which utilizing the LXM to provide the response to the user prompt in the manner that will avoid the disclosure of the privacy information includes presenting the user prompt to the LXM multiple times, receiving multiple different responses from the LXM, obtaining user context information from a source of physical context information and user background information, evaluating the received multiple different responses based on the user context information and the user prompt to identify one of the received multiple different responses that best responds to the user prompt, and presenting the identified one of the received multiple different responses to the user.

Example 11: The method of any of the examples 1-10, further including obtaining local context information from a data source available on a local context database, and using the obtained local context information in conjunction with the user prompt to provide the response to the user prompt in the manner that will avoid the disclosure of the privacy information.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/ types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudo static random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in a computing device, system on chip (SOC) or other electronic component. Any references to terminology and/or technical details related to an individual type of memory, interface, standard or memory technology are for illustrative purposes only, and not intended to limit the scope of the claims to a particular memory system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (TCUASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store target program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A computing device, comprising:
a memory; and
at least one processor coupled to the memory and configured to:
 receive a user prompt from a user;
 process the user prompt to generate a privacy enhanced user prompt in which privacy information or other information that may cause a large generative artificial intelligence model (LXM) to provide a response that reveals the privacy information is modified, substituted, or removed;
 provide the privacy enhanced prompt to the LXM;
 receive a plurality of sample responses from the LXM;
 for each sample response of the plurality of sample responses, determine a ranking score for the sample response, the ranking score based, at least in part, on:
  a relevance of the sample response to the user prompt;
  a relevance of the sample response to physical context information indicative of a current physical condition of the user or of an environment of the user;
  user background information comprising data indicative of characteristics, preferences, or demographics of the user;
  a model confidence score indicative of a likelihood that the sample response is accurate;
  privacy preservation based on evaluating whether the sample response would reveal privacy information; or
  a combination thereof;
 select, as a best output, a sample response of the plurality of sample responses based, at least in part, on the ranking scores; and
 provide a response to the user based on the best output.

2. The computing device of claim 1, wherein the at least one processor is further configured to process the user prompt to generate the privacy enhanced user prompt using a trained model that has been trained to recognize the privacy information.

3. The computing device of claim 1, wherein the at least one processor is further configured to contextualize the best output to include privacy information in the user response.

4. The computing device of claim 1, wherein the at least one processor is further configured to:
 obtain user context information from a source of physical context information and user background information;
 identify user context information and user background information that could pose a privacy risk; and
 generate the privacy enhanced user prompt based on substitution, modification, or removal of user context information and user background information that is identified to pose the privacy risk.

5. The computing device of claim 1, wherein the at least one processor is further configured to:
 determine whether the user is in a location where the response to the user could be viewed by others; and
 avoiding disclosure of privacy information by:

preventing presentation of the response to the user based on determining that the user is in a location where the response to the user could be viewed by others and further based on determining that the response to the user includes privacy data.

6. The computing device of claim 5, wherein the at least one processor is further configured to notify the user that the response to the user is not being presented to prevent the disclosure of privacy information.

7. The computing device of claim 4, wherein the at least one processor is further configured to:
 obtain local context information from a data source available on a local context database; and
 generate the privacy enhanced user prompt based, at least in part, on the obtained context information.

8. A method of interacting with a large generative artificial intelligence model (LXM), comprising:
 receiving a user prompt from a user;
 processing the user prompt to generate a privacy-enhanced user prompt in which privacy information or other information that may cause the LXM to provide a response that will reveal the privacy information is modified, substituted, or removed;
 providing the privacy-enhanced prompt to the LXM;
 receiving a plurality of sample responses from the LXM;
 for each sample response of the plurality of sample responses, determine a ranking score for the sample response, the ranking score based, at least in part, on:
  a relevance of the sample response to the user prompt;
  a relevance of the sample response to physical context information indicative of a current physical condition of the user or of an environment of the user;
  user background information comprising data indicative of characteristics, preferences, or demographics of the user;
  a model confidence score indicative of a likelihood that the sample response is accurate;
  privacy preservation based on evaluating whether the sample response would reveal privacy information; or
  a combination thereof;
 select, as a best output, a sample response of the plurality of sample responses based, at least in part, on the ranking scores; and
 providing a response to a user based on the best output.

9. The method of claim 8, wherein generating the privacy-enhanced user prompt comprises processing the user prompt using a trained model that has been trained to recognize the privacy information.

10. The method of claim 8, further comprising:
 contextualizing the best output to include privacy information in the user response.

11. The method of claim 8, further comprising:
 obtaining user context information from a source of physical context information and user background information; and
 identifying user context information and user background information that could pose a privacy risk; and
 generating the privacy enhanced user prompt based on substitution, modification, or removal of user context information and user background information that is identified as posing a privacy risk.

12. The method of claim 8, further comprising:
 determining whether the user is in a location where the response to the user could be viewed by others; and
 avoiding disclosure of privacy information preventing presentation of the response to the user based on determining that the user is in a location where the response to the user could be viewed by others and further based on determining that the response to the user includes privacy data.

13. The method of claim 12, further comprising notifying the user that the response to the user not being presented to prevent the disclosure of privacy information.

14. The method of claim 11, further comprising:

obtaining local context information from a data source available on a local context database; and generating the privacy enhanced prompt based, at least in part, on the obtained user context information.

15. A computing device, comprising:

means for receiving a user prompt from a user;

means for processing the user prompt to generate a privacy enhanced user prompt in which privacy information or other information may cause a large generative artificial intelligence model (LXM) to provide a response that reveals the privacy information is modified, substituted, or removed;

means for providing the privacy enhanced prompt to the LXM;

means for receiving a plurality of sample responses from the LXM;

means for determining a ranking score for each sample response the plurality of sample responses, the ranking score based, at least in part, on:

a relevance of the sample response to the user prompt;

a relevance of the sample response to physical context information indicative of a current physical condition of the user or of an environment of the user;

user background information comprising data indicative of characteristics, preferences, or demographics of the user;

a model confidence score indicative of a likelihood that the sample response is accurate;

privacy preservation based on evaluating whether the sample response would reveal privacy information; or a combination thereof;

means for selecting, as a best output, a sample response of the plurality of sample responses based, at least in part, on the ranking scores; and means for providing a response to the user based on the best output.

16. The computing device of claim 15, wherein the means for processing the user prompt to generate the privacy enhanced user prompt comprises means for processing the user prompt in a trained model that has been trained to recognize privacy information.

17. The computing device of claim 15, further comprising:

means for contextualizing the best output to include privacy information in the user response.

18. The computing device of claim 15, further comprising:

means for obtaining user context information from a source of physical context information and user background information; and means for generating the privacy enhanced user prompt based, at least in part, on the user context information and user background information.

19. The computing device of claim 15, further comprising:

means for determining whether the user is in a location where the response to the user could be viewed by others; and means for preventing presentation of the response to the user based on determining that the user is in a location where the response to the user could be viewed by others and further based on determining that the response to the user includes privacy data.

20. A non-transitory processor readable media having stored thereon processor-executable instructions configured to cause at least one processor of a computing device to perform operations comprising:

receiving a user prompt from a user;

processing the user prompt to generate a privacy enhanced user prompt in which privacy information or other information that may cause large generative artificial intelligence model (LXM) to provide a response that reveals the privacy information is modified, substituted, or removed;

providing the privacy enhanced prompt to the LXM;

receiving a plurality of sample responses from the LXM;

for each sample response of the plurality of sample responses, determine a ranking score for the sample response, the ranking score based, at least in part, on:

a relevance of the sample response to the user prompt;

a relevance of the sample response to physical context information indicative of a current physical condition of the user or of an environment of the user;

user background information comprising data indicative of characteristics, preferences, or demographics of the user;

a model confidence score indicative of a likelihood that the sample response is accurate;

privacy preservation based on evaluating whether the sample response would reveal privacy information; or a combination thereof;

select, as a best output, a sample response of the plurality of sample responses based, at least in part, on the ranking scores; and providing a response to the user based on the best output.

* * * * *